US011168666B1

(12) United States Patent
van Loon et al.

(10) Patent No.: US 11,168,666 B1
(45) Date of Patent: Nov. 9, 2021

(54) JACK-UP PLATFORM WITH RECEIVING SPACE FOR A BARGE AND METHOD FOR OFFSHORE INSTALLATION OF A WIND TURBINE

(71) Applicants: DEME Offshore BE NV, Zwijndrecht (BE); Foss Maritime Company, Seattle, WA (US)

(72) Inventors: Jeroen van Loon, Vosselaar (BE); Courtney Bradbury, Seattle, WA (US); Paul F. Gallagher, Seattle, WA (US)

(73) Assignees: DEME Offshore BE NV, Zwijndrecht (BE); Foss Maritime Company, Seattle, WA (US)

( * ) Notice: Subject to any disclaimer, the term of this patent is extended or adjusted under 35 U.S.C. 154(b) by 0 days.

(21) Appl. No.: 17/083,550

(22) Filed: Oct. 29, 2020

(51) Int. Cl.
| | |
|---|---|
| *F03D 13/25* | (2016.01) |
| *E02B 17/02* | (2006.01) |
| *B63B 35/00* | (2020.01) |
| *F03D 13/40* | (2016.01) |
| *F03D 13/10* | (2016.01) |
| *E02B 17/00* | (2006.01) |

(52) U.S. Cl.
CPC ............ *F03D 13/25* (2016.05); *B63B 35/003* (2013.01); *E02B 17/021* (2013.01); *F03D 13/10* (2016.05); *F03D 13/40* (2016.05); *E02B 2017/006* (2013.01); *E02B 2017/0047* (2013.01); *E02B 2017/0091* (2013.01); *F05B 2230/6102* (2013.01); *F05B 2240/95* (2013.01)

(58) Field of Classification Search
CPC combination set(s) only.
See application file for complete search history.

(56) References Cited

U.S. PATENT DOCUMENTS

| | | | | |
|---|---|---|---|---|
| 1,533,776 | A | * 4/1925 | Tiburtius | .............. B63B 25/006 114/260 |
| 3,973,512 | A | * 8/1976 | Fahrner | ................... B63B 35/70 114/248 |

(Continued)

FOREIGN PATENT DOCUMENTS

| | | |
|---|---|---|
| EP | 2228533 B1 | 5/2015 |
| EP | 2724021 B1 | 5/2019 |

*Primary Examiner* — Kyle Armstrong
(74) *Attorney, Agent, or Firm* — The Webb Law Firm

(57) ABSTRACT

A jack-up platform is described having a horizontal working deck that may be jacked up out of the water by moving its legs to a position wherein they take support on an underwater bottom. The jack-up platform further includes a higher level deck and a lower level deck that define a receiving space for a barge, optionally suitable for carrying parts for construction of a wind turbine, and further a deballasting system configured to bring the floating hull between a receiving position at which the hull is ballasted to a receiving draft in which the lower level deck is submerged underwater and the barge may be received in the receiving space through an opening in the hull, and an operational smaller draft where substantially no water can flow on either of the lower and higher level decks. The receiving space has a centralizing system configured to substantially centralize the received floating barge in the receiving space. A method for facilitating the offshore installation of a wind turbine using the jack-up platform is also described.

24 Claims, 23 Drawing Sheets

(56) References Cited

U.S. PATENT DOCUMENTS

| | | | | |
|---|---|---|---|---|
| 7,827,925 B2* | 11/2010 | Hirayama | ............... | B63B 19/08 |
| | | | | 114/258 |
| 10,569,977 B1* | 2/2020 | Hammer | ................ | B65G 67/62 |
| 2012/0192782 A1* | 8/2012 | Eide | ...................... | B63B 35/003 |
| | | | | 114/313 |
| 2020/0017337 A1* | 1/2020 | Van Loon | ............... | B63B 17/00 |

* cited by examiner

JACK-UP PLATFORM WITH RECEIVING SPACE FOR A BARGE AND METHOD FOR OFFSHORE INSTALLATION OF A WIND TURBINE

BACKGROUND OF THE INVENTION

Field of the Invention

The invention relates to a jack-up platform that may be used for facilitating the offshore installation of a wind turbine. The invention further relates to a method for facilitating the offshore installation of a wind turbine using the jack-up platform.

Description of Related Art

The invention is particularly relevant in the context of facilitating transport and/or installation of offshore wind turbine generators, but the invented jack-up platform could potentially also be deployed in other offshore sectors, such as but not limited to Oil & Gas, Offshore Pile and Cable lay business and in fact to all marine environment sectors.

A jack-up platform typically comprises a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water.

The offshore installation of a wind turbine according to known practice may involve the following steps:
1. a jack-up vessel equipped with a lifting crane picks up multiple turbine sets in a port, a set comprising enough turbine parts to complete a wind turbine;
2. the jack-up vessel, loaded with such turbine sets, sails from said port to the offshore wind area of choice where the installation needs to be carried out;
3. the jack-up vessel positions offshore at the correct location, puts its legs into the underwater bottom and jacks its hull out of the water to create a stable installation platform;
4. all the components of a first turbine are then installed by lifting them onto a foundation already provided in the water, using the platform vessel's lifting crane;
5. the jack-up then lowers its hull back into the water and retract it's legs from the underwater bottom;
6. the jack-up platform then repeats steps 3-5, until all turbine sets present on board are installed;
7. after installation, the platform vessel sails back to the port to repeat the full cycle until the project is finished.

The above described procedure has several drawbacks. For instance, ports may have air draft restrictions that may prevent jack-up type vessels from entering the ports. Further, limits on the visibility of the turbines from land in conjunction with the larger generation turbines have pushed the lease area—where turbines are allowed to be positioned—farther offshore, which increases the transportation time from port to the installation site.

Also, at more remote installation sites, water bottom depths may be larger than closer to shore. This would require a jack-up platform having longer legs as well in order to be able to reach the water bottom or sea bed in the low position of said legs and stabilize the platform. A platform having longer legs than known nowadays (longer than 75 m), may not be able to reach a port at all, for instance when bridges interfere with the length of the legs in their high position.

Another known method involves performing the actual transport of the wind turbine generator parts or components or other cargo from a land location, such as a port, to the offshore wind installation by using barges (or any other means of floating vessels) that may be towed and assisted by tugs. The actual installation of the wind turbine components is then carried out by a traditional crane jack-up vessel, or main floating installation vessel as known in the art, or any installation object provided with a lifting crane. Such installation vessel preferably stays offshore as long as needed or possible.

When using the above two vessels (installation platform and a transport barge) for installation on an offshore construction site, the jack-up lifting crane, which is deployed after jacking-up the jack-up installation vessel out of the water to create a stable lifting platform, will need to lift all components from the floating 'feeder' barge. The motions of the barge may generate a couple of engineering challenges to solve.

A floating barge in water indeed is subject to movements according to six degrees of freedom. Translational movements comprise heave, sway and surge. Where heave is a vertical movement, sway is the side to side or port to starboard movement and surge is the front to back or bow to stern movement. Rotational movements comprise pitch, roll and yaw. Where pitch is a rotation of a vessel about its lateral (port-starboard) axis, roll is the rotation about its longitudinal (bow-stern) axis, and yaw is the rotation about its vertical axis. Heave, sway, surge, pitch, roll and yaw movements are defined in a coordinate system fixed to the floating vessel and therefore may differ from movements in the vertical and two horizontal directions, defined by a coordinate system fixed to the outside world. The motions of the water mass are transferred onto the barge that is floating into the water. The induced barge movements, in turn, impose motions and accelerations onto the components that are sea fastened on board of the barge and transported by the barge.

One engineering challenge relates to the fact that existing wind turbine generator components are usually designed together with a rigging setup and a specialized lifting and installation tool that only can be connected safely in a static environment. These tools will need to be adapted to cope with all the motions transferred to the components in order to connect these tools, which are rigged under the jack-up vessel's fixed crane hook onto the moving components.

On top of this, manual handling normally is involved when connecting these lifting tools, which may involve danger to human personnel. Another engineering challenge therefore addresses the adaptation of the lifting tools in order to be equipped automatically without the need of trained personnel on the floating barge on top of the moving components, which could lead to unsafe scenarios. As these lifting operations in offshore conditions may involve large weights, these should be looked at from a highest safety aspect and are without the correct engineering being seen by the industry as being dangerous operations. Further, when lifting off a component of the floating barge with a fixed lifting crane, the relative motions between the floating barge and the components during the first phase of the lifting operations can cause the component to re-hit with the deck of the barge vertically, or with another structure on the barge horizontally.

Yet another engineering challenge is to find ways of preventing or dampening out these relative motions. If the hoisting speed of lifting cranes were infinitely fast, this would not be a problem. In reality, heavy duty lifting cranes will in many sea states not be able to hoist the components fast enough from the floating barge to ensure a safe engineered lift without the possibility of a re-hit. The hoisting acceleration may in many cases not be sufficiently high as the vertical accelerations of the barge moving in the water may actually be higher. A re-hit (in the vertical direction) of the lifted component with the floating barge could damage either the component itself, the floating barge, both or other items in the vicinity as after the re-hit the component can start swinging uncontrollably in the horizontal direction as well, potentially even damage the jack-up vessel and/or its lifting crane. As the movements of the barge are translated into the components, the lift will always happen under a certain barge angle. It is virtually impossible to perform the lift-off at the exact moment where the barge will be completely horizontal in both its cross directions (longitudinal and transversal). Even if this was possible, this moment will only last a split second and so by the time the lifting crane has been activated and actually hoisting at full velocity, this moment is gone. This means that immediately when the lift-off occurs a swinging movement (horizontally) will occur as well, which needs to be solved in order to perform a controlled lift and transfer of components from the floating feeder barge to the fixed jack-up platform's deck or immediately to the fixed pre-installed foundation location. This means not only horizontal swinging movements could occur after a vertical re-hit, but will happen as well by default when lifting the components from the floating barge.

Further, due to the fact that the components are sea fastened for offshore transport, these fastenings will have to be released while the floating feeder barge is still moving. For most of the components, a relative standard sea fastening design is known. These are designed in a way that they need to be fixed and released in relatively static condition, but once fixed will foresee the needed fastening to cope with vessel motions during sea transport. The standard way of releasing the sea fastenings is a time consuming process. Most of the times components are fastened or locked on several places with multiple separate fasteners. Releasing the fasteners (e.g. bolts, welds) often needs to be done one by one and may often involve manual handling. If well engineered, this manual handling will not be seen as a large risk as the components are still under static conditions when released and will not fall over (assuming the sea fastened is levelled horizontally). Once the fasteners are released, when the vessel conditions are static or almost static (calm waters, e.g. in port), the components are standing stable on the sea-fastenings keeping stability by its own self-weight. Where for example, one bolt or weld will not provide the necessary connection strength to hold the component locked in place during sea transport, but the combination of many will. Also, the release and locking process of the sea fastenings will only be done at certain maximum wind speeds, so the wind against the component's surfaces is not causing the component to fall over when not fastened. In dynamic offshore conditions, the barge is moving relatively fast in the waves, which means that when the sea fastening is released the barge and so the components will be subject to an alternating angle with the horizontal plane in all possible different directions. This angle with the horizontal plane, potentially combined with horizontal wind forces, could cause the components to fall over when released. Also, as a sea-fastening often locks using multiple fasteners, and normally these are released in sequence, the component could lose already stability during the releasing process. The barge motions will apply stresses into the sea fastening and will divide these forces over all locked fasteners. All locked fasteners together will be capable of coping with these distributed forces as per design, but when in the middle of the releasing process, when certain fasteners are unlocked in a dynamic environment, they will not contribute anymore in counteracting the total reaction forces and these will be redistributed through the fasteners still locked, meaning they need to take up larger forces at that moment. When releasing more and more fasteners, the loading in the remaining locked fasteners will only increase until they reach a state of plastic deformation and even breaking point after which the component, still subject to motions can tip over losing its stability. This could cause irreversible damage as well to all other components and all vessels in the vicinity, including the floating barge itself. Releasing the sea fastenings of the components on the floating feeder barge in offshore conditions in a quick and automated way without components having the time to lose stability before the actual lift-off occurs, is another engineering challenge to solve.

There is therefore a need for a solution to the above-described problems of the prior art. In particular, a need exists to provide an improved method for facilitating the offshore installation of a wind turbine, using a jack-up platform adapted for the purpose. A particular aim relates to helping in bridging the transport of offshore wind components and their installation phases.

SUMMARY OF THE INVENTION

It is an aim of the invention therefore to provide an improved jack-up platform that may be advantageously used in a method for facilitating the offshore installation of a wind turbine. Another aim is to provide such a method.

Provided for this and other purposes is a jack-up platform in accordance with claim 1. The invented jack-up platform comprises a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water, wherein the jack-up platform further comprises a higher level deck and a lower level deck that define a receiving space for a barge, optionally suitable for carrying parts for construction of a wind turbine, and further a (de)ballasting system configured to bring the floating hull between a receiving position at which the hull is ballasted to a receiving draft in which the lower level deck is submerged underwater and the barge may be received in the receiving space through an opening in the hull, and an operational smaller draft wherein substantially no water can flow on either of the lower and higher level decks, wherein the receiving space further comprises a centralizing system configured to substantially centralize the received floating barge in the receiving space.

The invention combines the functionality of a jack-up vessel with that of a semi-submersible heavy lift vessel. In this way, the semi-submersible is able to submerge to a depth capable of receiving cargo on a flat deck barge. Once again de-ballasted, the barge with cargo is standing fixed on the lower level deck of the jack-up platform, which can be jacked out of the water to allow fixed bottom stability for the installation works.

The actual transport of the wind turbine generator parts or components or other cargo from a land location, such as a port, to the offshore wind installation site may, and preferably is, done using barges (or any other means of floating vessels) that may be self-propelling in an embodiment of may be towed and assisted by tugs in another embodiment. A combination of these embodiments is also possible.

The actual installation of the wind turbine components may, and preferably is, carried out by a traditional crane jack-up vessel, or main floating installation vessel as known in the art, or any installation object provided with a lifting crane. Such installation vessel preferably stays offshore as long as needed or possible.

The invented jack-up platform is used to transform the floating barge, carrying the cargo and susceptible to all the above-described motions, into a fixed platform offshore to facilitate and solve all the above disclosed challenges of the prior art at once.

In an embodiment in which an installation jack-up platform equipped with a suitable lifting device is used for the actual installation of the wind turbine parts or components, a particularly stable environment is created since the lifting crane, and the components to be hoisted are both supported by a relatively stable substrate, i.e. by the two jack-up platforms in their jacked-up position. Positioning of the two jack-up platforms may be relatively close. The capacity of the lifting device on the installation jack-up platform may therefore be utilized to its fullest. This may be different for a floating barge carrying the components, since such as barge would have to leave some distance to (the legs of) the installation jack-up platform in order to prevent hitting the platform by wave motion.

The jack-up platform according to the invention may be floating, may be in a semi-jacked-up position, in which its hull is still in the water, or may be jacked-up with its hull fully out of the water. The jack-up platform in the latter case represents a relatively stable position for the installation procedure. The jack-up platform may be self-propelling in which case it is generally referred to as a jack-up vessel. It is expressly stated that when a jack-up platform is referred to throughout the present disclosure, reference is also made to a jack-up vessel, unless indicated otherwise.

The invented jack-up platform may be used with advantage in a method for the offshore installation of a wind turbine.

According to another aspect of the invention, a method for facilitating the offshore installation of a wind turbine is provided, the method comprising the steps of:
  providing a jack-up platform in accordance with the invention;
  with the platform in a floating position, ballasting the hull to the receiving draft in which the lower level deck is submerged underwater;
  receiving a barge, carrying parts for construction of a wind turbine, in the receiving space through an opening in the hull;
  substantially centralizing the floating barge in the receiving space using the centralizing system;
  with the platform in a floating position, deballasting the hull to the operational smaller draft in which substantially no water can flow on either of the lower and higher level decks, and the barge is supported by the lower level deck;
  bringing the floating platform in the vicinity of an installation site for the wind turbine; and
  moving the legs of the jack-up platform to a lower position, in which the legs take support on the underwater bottom and the hull is jacked out of the water.

The components (or parts) of a wind turbine may comprise a tower (or tower parts), a nacelle (or rotor), blades (provided on a blade rack with a single blade, or a multiple blade rack containing multiple blades), and/or a pre-assembled combination of the above in any form. The tower could be provided as a full tower, or as a split tower (two or more sections). These components represent considerable weights. For instance, a complete tower may easily weigh 1200 metric tons, while each section of a two-section tower may weigh up to 800 metric tons. Each section of a three-section tower may weigh up to 400 metric tons, as an example. A nacelle may easily have a weight of 800 metric tons, while a blade may represent a weight up to 400 metric tons and even more.

The jack-up platform according to the invention may be used to facilitate all other offshore works in the offshore wind renewable sector as well. Other components that may for instance be transported or installed include but are not limited to foundations of all types, transmissions stations, cables, and/or spare components and the like. A non-exhaustive list with weight indication may include wind turbine foundation components, such as a monopile (2500 metric tons), a transition piece (50 metric tons), an anode cage or anode cage tower containing multiple anode cages (100 metric tons), a jacket (1600 metric tons) and transmission stations (5000 metric tons). Also, general items, such as but not limited to supply containers of any kind (20 metric tons), offshore wind installation equipment (50 metric tons) and spare vessel and equipment parts (100 metric tons) may be involved.

The platform may also be used to facilitate offshore wind commissioning works, offshore wind turbine generator's maintenance works, and/or works involving an offshore accommodation vessel.

The centralizing system of the jack-up platform may be embodied in a number of ways.

In one embodiment, the centralizing system is configured to substantially centralize the received floating barge in the middle of the receiving space in a transverse direction of the receiving space. A transverse direction of the receiving space is defined as being perpendicular to a longitudinal direction of the receiving space, which longitudinal direction of the receiving space extends from the aft to the bow of the platform. The transverse direction may therefore also be defined as being parallel to an athwartship direction of the platform.

In another embodiment, the centralizing system is configured to substantially centralize the received floating barge in the middle of the receiving space in the longitudinal direction of the receiving space.

The centralizing system may comprise means for centralizing a barge that is held in the receiving space. In an embodiment of the invention, the centralizing system comprises centralizing means provided in side walls of the receiving space, which centralizing means can be brought in a position in which a surface thereof contacts a hull part of the barge with a non-zero force.

An embodiment of the jack-up platform is provided with centralizing means that comprise inflatable fenders that cooperate with a pressurizing pump for inflating the inflatable fenders. To centralize a floating barge in the receiving space in a transverse direction of the receiving space for instance, the inflatable fenders positioned on one side of the receiving space, such as port side for instance, may be inflated to push against the barge and bring it to a position closer to starboard. Alternatively, the inflatable fenders positioned on starboard of the receiving space may be inflated to push against the barge and bring it to a position closer to port side. It may also be possible to inflate inflatable fenders positioned on port side and on starboard with some pressure. The barge may then be moved by changing the pressure difference in the inflatable fenders between port side and starboard.

In another embodiment, the centralizing means may comprise cylinders, movably provided in one or more sidewalls of the receiving space. The cylinders cooperate with a pressurizing pump for moving the cylinders inwards or outwards from their side wall of the receiving space. The cylinders may be incorporated in a pneumatic or hydraulic circuit that also includes the pressurizing pump(s). As described above for an embodiment using inflatable fenders, the cylinders may centralize a floating barge in the receiving space by moving the cylinders outwards and/or retracting them inwards from a side wall of the receiving space. The cylinders may at their contact surface with the barge be provided with protective material, such as rubber pads.

The jack-up platform itself may be provided with a lifting crane configured for lifting the wind turbine construction parts, when stabilized on an installation site for the wind turbine. However, it is preferred to provide an embodiment of the jack-up platform without a lifting crane configured for lifting the wind turbine construction parts. Lifting may then be carried out by a separate installation jack-up platform stably provided close to the invented platform. Not having a lifting crane on the invented platform has certain advantages, for instance when (de)ballasting the platform.

Ballasting and deballasting the jack-up platform may be performed by any means known in the art for that purpose. A practical embodiment provides a jack-up platform wherein the (de)ballasting system comprises water containers integrated with the hull and (de)ballasting pumps configured for pumping water in and out of said water containers. Pumping water into the containers will increase the mass of water in the containers and cause a ballasting effect, i.e. the hull of the floating platform will gain draft. Pumping water out of the containers will decrease the mass of water in the containers and cause a deballasting effect, i.e. the hull of the floating platform will loose draft. Although water is a practical fluid, other fluids may also be used. It is also possible to use air, in which embodiment the effect caused will be inverse. Adding air will cause the hull of the floating platform to loose draft, while removing air will cause the hull of the floating platform to gain draft.

According to the invention, the jack-up platform may have one opening in its hull through which the barge may be received in the receiving space. However, the jack-up platform may also have more than one opening in its hull for this purpose. In a preferred embodiment, a jack-up platform is provided wherein an aft hull part comprises the opening in the hull, which opening is large enough for receiving the barge in the receiving space. Another embodiment provides a jack-up platform wherein a bow hull part comprises the opening in the hull, wherein the opening is again large enough for receiving the barge in the receiving space. Yet other embodiments comprise a jack-up platform wherein a side hull part comprises the opening in the hull, that are large enough for receiving the barge in the receiving space. It should be noted that the openings for letting through the barge may be combined in the above-described embodiments. For instance these opening may be provided in an aft part of the hull and a bow part of the hull, or in an aft part of the hull and one or two of the side parts of the hull.

The dimensions of the opening(s) can be determined by one skilled in the art, depending on the dimensions of the barge and the orientation of the barge when received by the receiving space. When the barge is received by moving it in its longitudinal direction via an aft-or bow-side opening, the width of the opening should be large enough to accommodate the width of the barge. When the barge is received by moving it sideways in its transverse direction via a side opening, the length of the opening should be large enough to accommodate the length of the barge.

Apart from the centralizing system, docking of the barge in the invented jack-up platform may also benefit from an improved embodiment wherein the lower level deck of the receiving space comprises support elements for the barge, such as wooden blocks, having an upper support surface with a relatively high coefficient of friction. This embodiment improves the stability of a barge that has been received in the receiving space when the hull of the platform has been deballasted.

As already disclosed above, the jack-up platform according to an embodiment may be self-propelled without the barge, in which embodiment the platform is usually referred to as a jack-up vessel. In another embodiment, the platform comprising the barge is self-propelled. It may further comprise a dynamic positioning (DP) system. A dynamic positioning (DP) system also requires a certain amount of thrusting capacity capable of holding the floating jack-up vessel in a fixed position. The more power the DP system possesses, the more accurate it can keep a certain position up to a designed sea state. Using a floating vessel equipped with a DP system in close proximity with another structure (for instance an elevated installation jack-up platform, an offshore foundation or other) may also involve risks. A DP system's power is continuously adjusting to cope with external forces (water, wind, other, . . . ). As the system is working close to a structure, its own thruster force may induce forces that come into contact with the fixed structure and are reflected from it. This could cause the DP system to assume that the structure is applying a direct force onto the floating vessel (even if a physical connection between the floating vessel and the jack-up vessel has not been made). The DP system could try to react against this 'fake' external force by activating more power in the direction of the structure. This could cause the DP system to actually move the floating vessel towards the structure with a risk for collision. It may therefore be advisable not to use the DP system when close to another structure.

The deck lay-out of the invented platform may be of a standard design. However, certain embodiments of the platform are provided wherein the deck lay-out has been altered with respect to the known deck lay-out. For instance, a practical embodiment of the invention provides a jack-up platform wherein the higher deck further comprises at least one control cabin positioned at the entrance of the receiving space. This will allow so-called joy-stick control over the platform when the barge is actually entering the receiving space. As stated in the paragraph above, DP control could involve the risk of a collision between the ballasted floating jack-up platform and the barge entering the receiving space. This risk is reduced by this embodiment that indeed provides an improved overview over the operations.

It is not uncommon that cargo may actually extend over the deck of the barge. This may for instance be the case when transporting wind turbine blades, which, by their very nature, are elongated structures with a relatively large length. In order to be able to centralize a barge that has been received in the receiving space without any obstruction, an embodiment of the jack-up platform wherein the hull comprises an access opening for wind turbine blades or other elongated objects, sticking out of the barge and eventually of the platform, is preferred.

The cargo-carrying barge may be received by the jack-up platform in its ballasted state. In order to facilitate the entrance of the barge in the receiving space, an embodiment is provided wherein the entrance of the receiving space is bordered by two tapered guiding structures, for instance two tapered cantilever arms, provided on each side of the entrance to the receiving space. When the opening is an aft opening (an opening in the stern of the platform), the guiding structures may comprise elongated elements that extend about parallel to the longitudinal direction of the jack-up platform, i.e. the direction of a line connecting the bow with the stern. The taper of the guiding structures is preferably provided at an inside surface of the guiding structures, by which is meant a surface facing the entrance of the receiving space.

The barge may be self-propelled and be able to sail into the receiving space on its own. However, a much safer operation is provided by a jack-up platform according to an embodiment of the invention, further comprising winches that operate mooring lines for the barge. The barge may then be guided by the mooring lines to safely enter the receiving space.

A first embodiment with improved guiding relates to a jack-up platform wherein the winches are provided at the bow of the platform. Mooring lines may then extend from the bow to (a bow part of) the barge. These front mooring lines are instrumental in pulling the barge into the receiving space.

A second embodiment with improved guiding relates to a jack-up platform that further comprises trolley winches provided on a rail structure extending along substantially the complete length of the first level deck, which trolley winches are movable from a position at the aft of the platform to a position closer to the bow of the platform.

In another embodiment, the jack-up platform may further comprise fenders provided at an outer surface of the hull.

In an improved embodiment that also provides protection when entering a barge inside the receiving space of the jack-up platform, the jack-up platform further comprises fenders provided at a side wall surface of the entrance to the receiving space, preferably rolling fenders.

A further improved embodiment provides a jack-up platform that further comprises fenders provided at a side wall and/or a bow surface of the receiving space, preferably rubber fenders.

The fenders provided at the side wall of the receiving space may be embodied in a number of ways. A preferred embodiment provides a jack-up platform wherein the fenders provided at the side wall of the receiving space extend into the receiving space over a distance that does not interfere with the centralizing system when activated. This may for instance be achieved by providing the fenders with a smaller extension into the receiving space than the centralizing system when activated.

Yet another embodiment relates to a jack-up platform further comprising floor fenders provided on the lower level deck, preferably rubber fenders.

A jack-up platform according to yet another embodiment of the invention is characterized in that the lower level deck of the receiving space comprises said support elements, such as wooden blocks, and the floor fenders in an uncompressed state extend higher than the support elements.

In an aspect of the invention, a jack-up platform according one of the embodiments described above, further comprises a barge received in the receiving space.

Another aspect of the invention relates to a jack-up platform that exhibits improved ballasting and deballasting behavior. According to this aspect of the invention, a jack-up platform is provided comprising a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water, wherein the jack-up platform further comprises a higher level deck and a lower level deck that define a receiving space for a barge, optionally suitable for carrying parts for construction of a wind turbine, and further a (de)ballasting system configured to bring the floating hull between a receiving position at which the hull is ballasted to a receiving draft in which the lower level deck is submerged underwater and the barge may be received in the receiving space through an opening in the hull, and an operational smaller draft wherein substantially no water can flow on either of the lower and higher level decks, wherein the hull comprises one or more further openings at one or both sides of the hull, and/or at the bow of the hull.

The further openings are not configured for letting a barge pass through for receipt in the receiving space. For instance, they may be too small to provide the function of letting the barge pass through. Alternatively, their dimensions may be adequate for this function but the opening may be partly obstructed.

A jack-up platform having further openings in its hull may allow faster ballasting and deballasting. For instance, smaller containers may be employed for receiving or expelling water for ballasting and deballasting. This embodiment may also add to the stability of the platform, which, generally speaking, may have a lower weight than in other embodiments.

In one embodiment, the further openings of the hull may be provided at both sides of the hull. In another embodiment, the one further opening of the hull may be provided at the bow of the hull.

It may have advantages to embody the jack-up platform according to the invention such that the one or more openings, preferably the side openings, are provided with a framework of stiffening ribs, and, optionally, also with a crossing walkway and/or with panels for breaking incoming waves.

In another embodiment, a lower wall of the one or more openings is level with the lower level deck surface.

The jack-up platform according to this aspect of the invention, i.e. exhibiting improved ballasting and deballasting behavior by providing its hull with one or more further openings at one or both sides of the hull, and/or at the bow of the hull, may also comprise features of the jack-up platform provided with the centralizing system disclosed above.

The invented jack-up platform may be used with advantage in a method for the offshore installation of a wind turbine. Such a method for facilitating the offshore installation of a wind turbine comprises the steps of:
  providing a jack-up platform in accordance with the present disclosure;
  with the platform in a floating position, ballasting the hull to the receiving draft in which the lower level deck is submerged underwater;
  receiving a barge, carrying parts for construction of a wind turbine, in the receiving space through an opening in the hull;
  substantially centralizing the floating barge in the receiving space using the centralizing system;

with the platform in a floating position, deballasting the hull to the operational smaller draft in which substantially no water can flow on either of the lower and higher level decks, and the barge is supported by the lower level deck;

bringing the floating platform in the vicinity of an installation site for the wind turbine; and moving the legs of the jack-up platform to a lower position, in which the legs take support on the underwater bottom and the hull is jacked out of the water.

In an embodiment of the method, receiving the barge is carried out with the platform in a floating position.

In another embodiment of the method, particularly showing the advantages thereof, the platform may be provided offshore.

Another embodiment relates to a method that further comprises mooring a wind turbine installation vessel that comprises a lifting crane for the wind turbine construction parts alongside the jack-up platform.

Yet another embodiment provides a method wherein sea-fastening means for the wind turbine construction parts are loosened to release said parts after the hull has been jacked out of the water, and the lifting crane lifts said wind turbine construction parts from the barge received in the jack-up platform to another substrate.

According to yet another embodiment, a method is provided wherein ballasting and deballasting the hull is carried out by pumping water in and out of the water containers respectively. Preferably, ballasting the hull is carried out to such extend that the water column in the receiving space is at least equal to the draft of the barge.

Another embodiment of the invention provides a method wherein the legs are positioned in an intermediate position in between the low and high position of sad legs, at least during receiving the barge, and more preferably also during ballasting and deballasting of the hull.

Yet another embodiment provides a method wherein ballasting the hull to the receiving draft in which the lower level deck is submerged underwater is carried out well before receiving the barge.

A method according to yet another embodiment further comprises undocking the barge from the platform by ballasting the hull, with the platform in a floating position, to an exiting draft in which the lower level deck is submerged underwater and the barge is free-floating, and exiting the barge from the receiving space through the opening in the hull.

Exiting the barge is carried out with the platform in a floating position, according to another embodiment of the invention. Preferably, the legs are positioned in an intermediate position in between the low and high position of said legs during exiting the barge.

The parts for constructing a wind turbine may comprise any part that is needed for such purpose. In a method according to an embodiment said parts for construction of a wind turbine comprise a foundation element, a tower element, a nacelle, and/or blades of a wind turbine.

It is expressly stated that the embodiments of the invention described in the present patent application may be combined in any possible combination of these embodiments. Each embodiment may further individually form the subject-matter of a divisional patent application.

BRIEF DESCRIPTION OF THE DRAWINGS

The invention will now be elucidated with reference to the following figures, without however being limited thereto. In the figures.

DESCRIPTION OF THE INVENTION

In the figures, the same reference numbers indicate same or similar features, unless noted otherwise.

Figure 1:
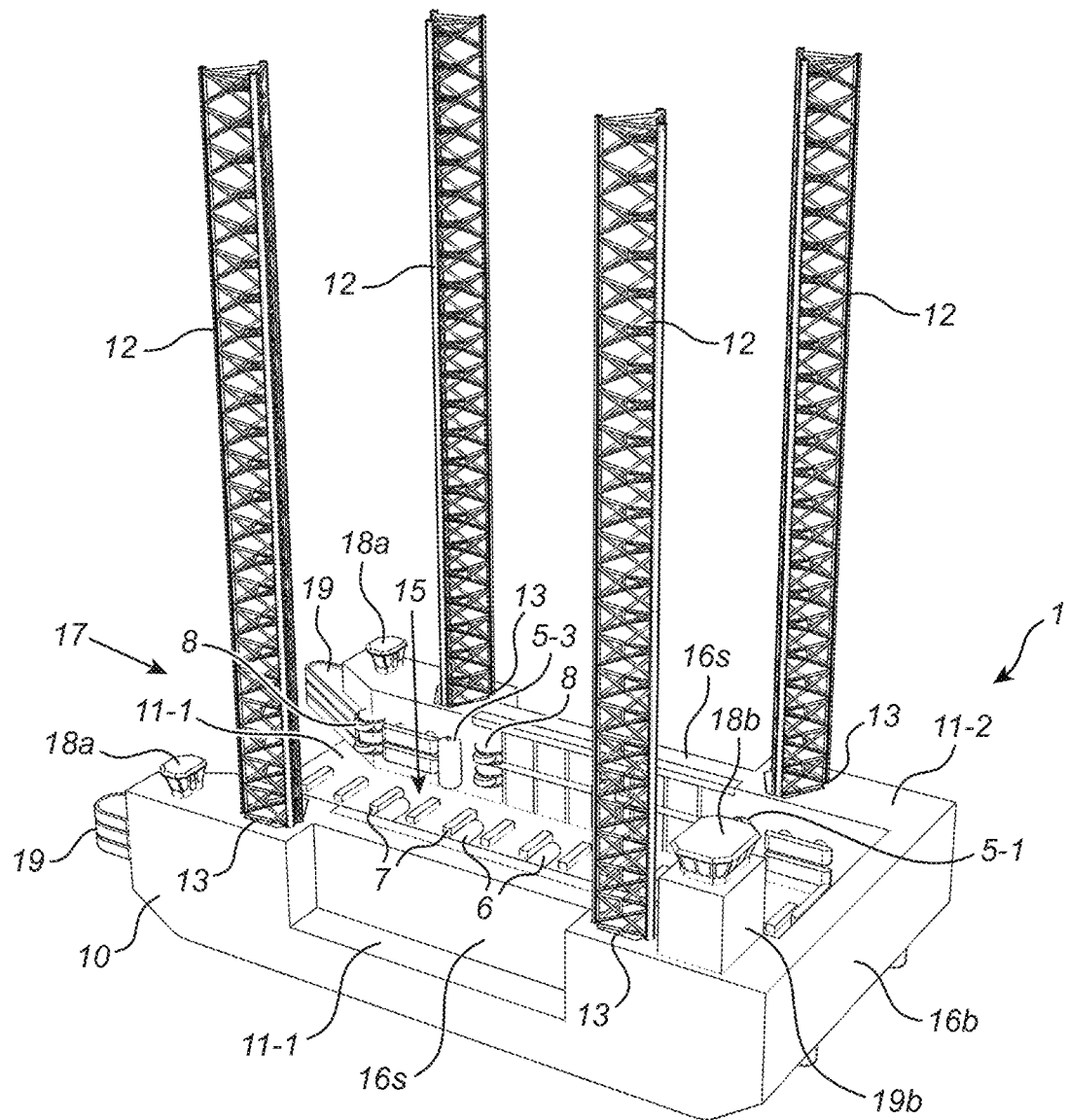
FIG. 1 represents a schematic perspective view of a jack-up platform in accordance with an embodiment of the invention.
Figure 2:
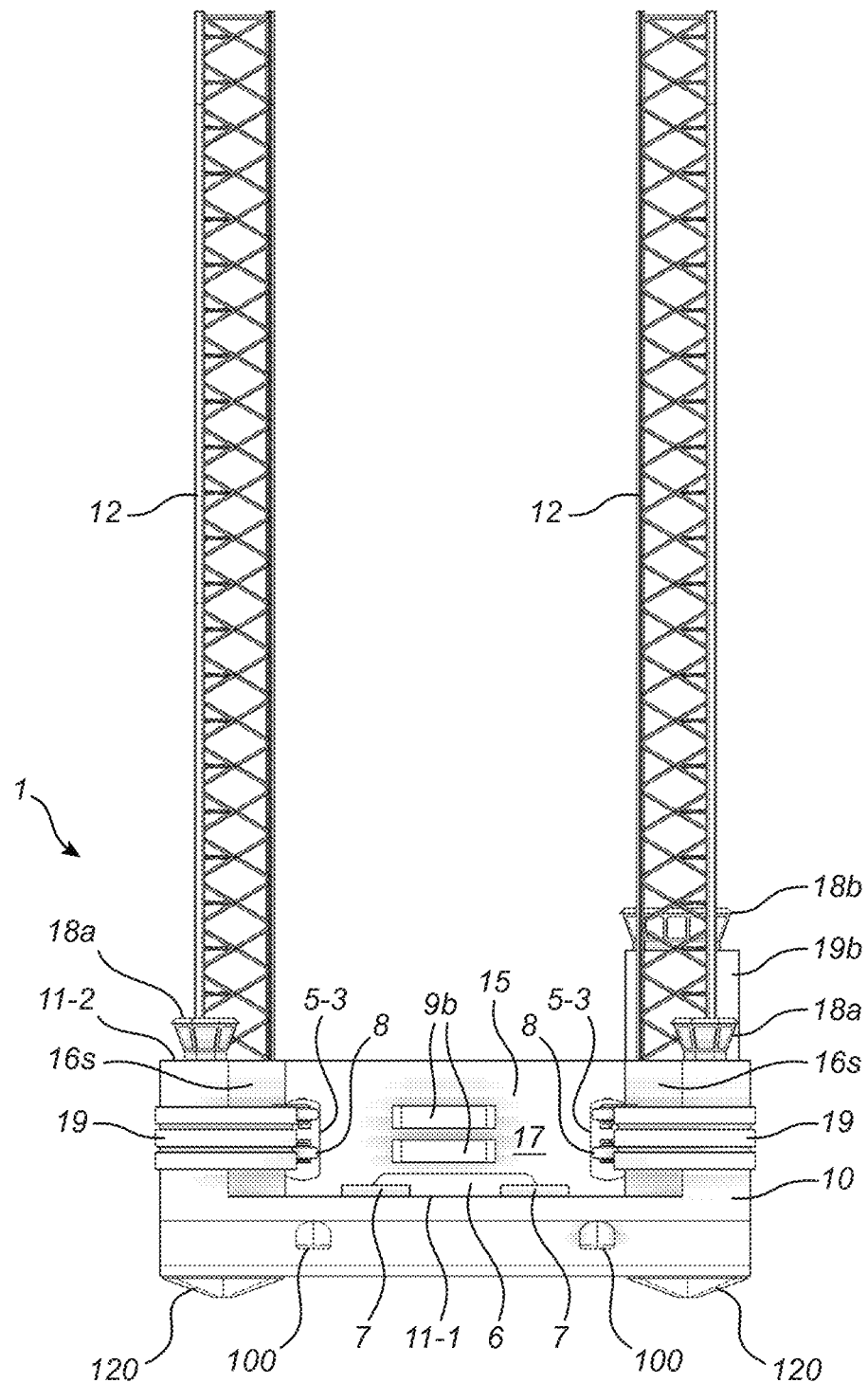
FIG. 2 represents a schematic aft view of the jack-up platform shown in the embodiment of FIG. 1 in a floating position.
Figure 3:
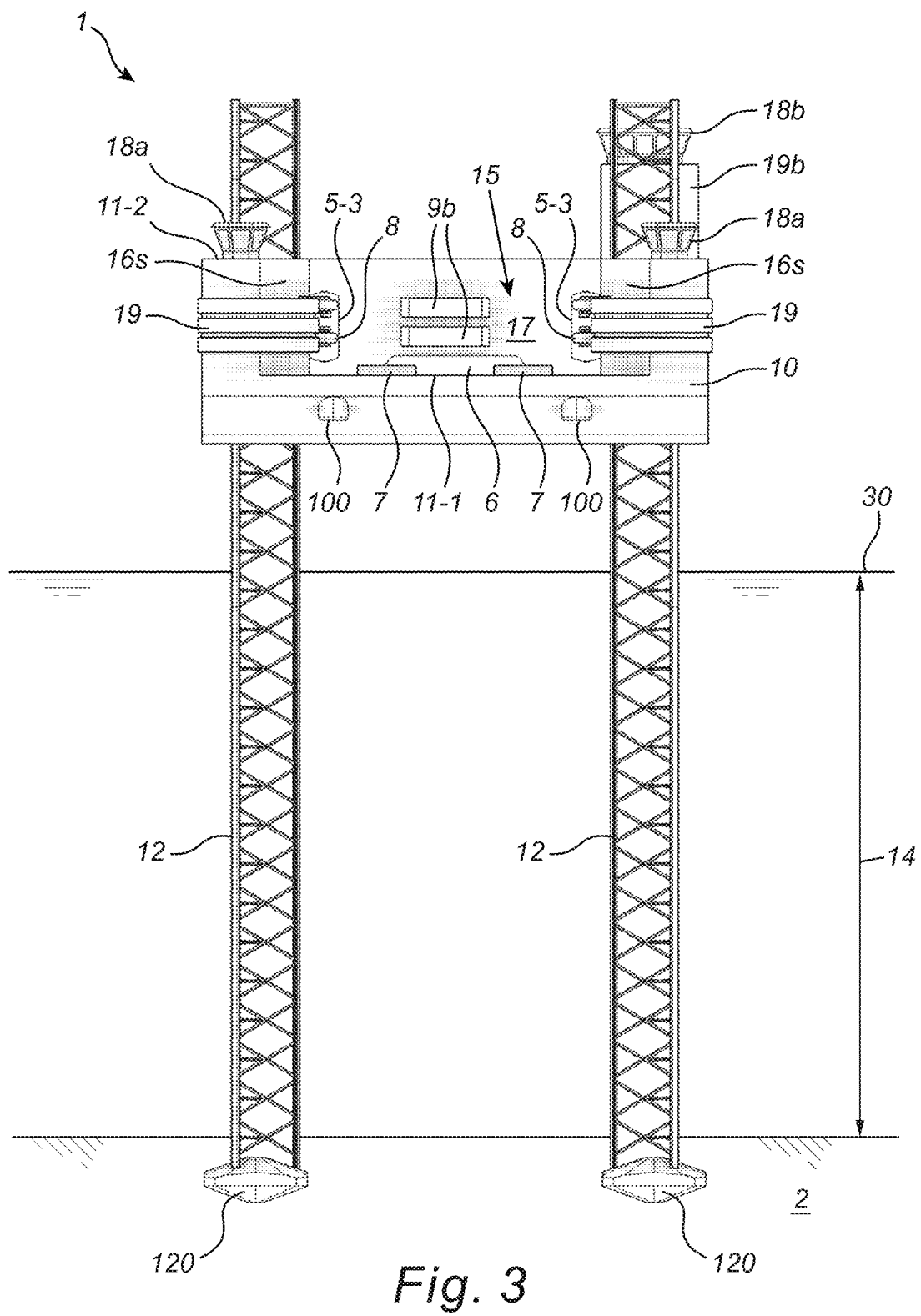
FIG. 3 shows a schematic aft view of the jack-up platform shown in the embodiment of FIG. 1 in a jacked-up position.

With reference to FIG. 1, a jack-up vessel or platform 1 in accordance with an embodiment of the invention comprises a hull 10, and a number of vertically extending legs 12 that connect to the hull 10 through jacking systems 13, provided on corners of the hull 10. Each jacking system 13 is configured to move a leg 12 between a higher position, shown in FIGS. 1, 2 and 4, in which the leg 12 is free from an underwater bottom 2 and the hull 10 is floating on the water 30, and a lower position, shown in FIGS. 3 and 4. In the lower position of the legs 12, each leg 12 takes support on or in the underwater bottom 2 and the hull 10 is jacked out of the water over some distance 14 between a bottom of the hull 10 and the water surface 30. The legs 12 shown are of lattice type and at a bottom side provided with shoes or spud cans 120. The legs 12 may be embodied differently however, and may for instance comprise solid legs, optionally without shoes 120.

The jack-up platform 1 further comprises a lower level deck 11-1 and a higher level deck 11-2 that together define a receiving space 15 for a barge 4. The receiving space 15 is confined at a bottom part by the lower level deck 11-1, at side parts by side walls 16s extending from the lower level deck 11-1 to the higher level deck 11-2, at a bow part by a bow wall 16b. In the embodiment shown in FIGS. 1-6, the side walls 16s and the bow wall 16b are closed solid walls. This may be different in other embodiments, as will be illustrated further below.

The barge 4 is suitable for carrying parts for construction of a wind turbine, such as foundation elements, tower elements, nacelles, and/or blades of such a wind turbine. The barge 4 may to this end be equipped with appropriate storage and fastening means for such parts.

Figure 4:
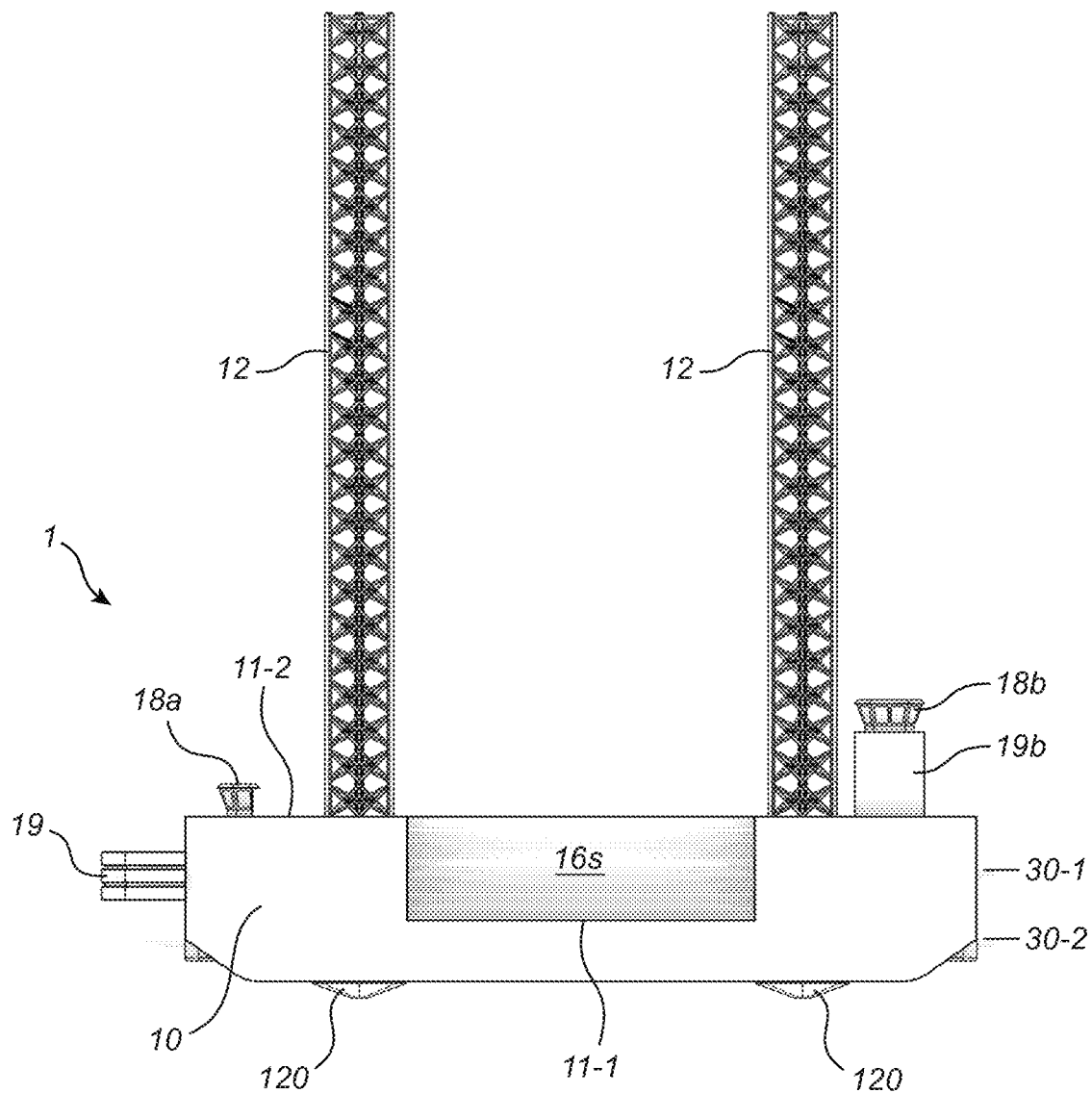
FIG. 4 represents a schematic side view of the jack-up platform shown in the embodiment of FIG. 1 in a floating position.
Figure 5:
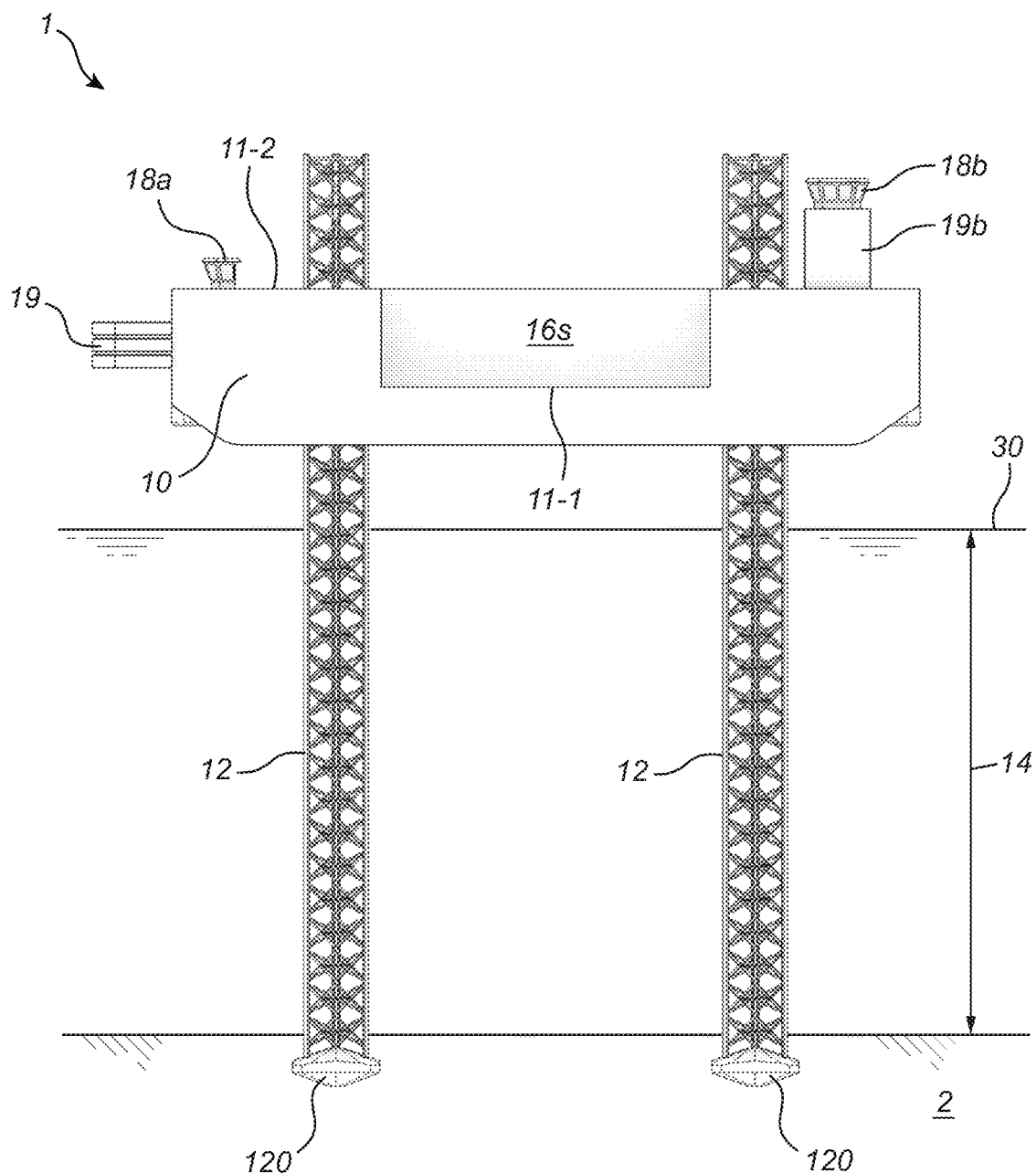
FIG. 5 shows a schematic side view of the jack-up platform shown in the embodiment of FIG. 1 in a jacked-up position.

The jack-up platform 1 further comprises a ballasting/deballasting system, denoted in short as a (de)ballasting system (not visible), configured to bring the floating hull 10 of the jack-up platform 1 between a receiving position for the barge 4 at which the hull 10 is ballasted to a receiving draft 30-1, as shown in FIG. 4, and an operational smaller draft 30-2, also shown in FIG. 4. With the hull 10 in the receiving draft 30-1, the lower level deck 11-1 is submerged underwater and the barge 4 may be received in the receiving space 15 through an opening 17 in the hull 10, which in the embodiment shown in FIGS. 1-6 is an aft opening 17. With the hull 10 in the operational smaller draft 30-2, substantially no water can flow on either of the lower level 11-1 and higher level decks 11-2, and the barge 4 is supported by the lower level deck 11-1.

The (de)ballasting system may be embodied in a manner known to one skilled in the art. A suitable (de)ballasting system comprises water containers integrated with the hull 10 and (de)ballasting pumps configured for pumping water in and out of said water containers. Since the containers and pumps are integrated with the hull 10 of the vessel 1, they are hidden from view by the hull 10, and therefore not visible in the figures. The size, amount and volume of the containers, as well as the capacity of the (de)ballasting pumps, may be selected according to engineering practice, taking into account factors like the size and weight of the barge 4 carrying the equipment or components.

According to the invention, the receiving space 15 of the jack-up platform 1 further comprises a centralizing system configured to substantially centralize a received floating barge 4 in the receiving space 15, as will be elucidated further below.

The jack-up vessel 1 combines the operation principles of both a semi-submersible vessel and a jack-up vessel. Hereto, the jack-up vessel 1 has a higher level deck 11-2 and a lower level deck 11-1, of which the lower level deck 11-1 can be submerged by influencing the draft by the (de)ballasting system.

In the figures, a jack-up platform 1 having four legs is shown. Alternatively, the vessel 1 could also be designed to have another amount of legs. Also, all figures are showing lattice truss legs 12 having a triangular cross-section in combination with a rack and pinion jacking system 13. Alternatively, the vessel 1 could also be designed with tubular legs or legs in any other shape with other jacking systems 13 in place, such as continuous or single-acting pin-in-hole systems or others.

The main purpose of the jack-up vessel 1 is facilitating between transport and installation works, where both the actual transport and the actual installation may or will be performed by other vessels. In an embodiment therefore, the jack-up vessel 1 does not have a main crane. However, other embodiments of the jack-up vessel 1 could be equipped with an offshore crane, which would transform the jack-up vessel or platform 1 into a main installation vessel.

The jack-up vessel 1 is capable of docking barges 4 on the lower level deck 11-1. However, it should be clear that also other types of vessels could be docked onto the invented jack-up vessel 1. In embodiments of the jack-up vessel 1, when sufficient suitable port infrastructure exists that allows for large jack-up vessels to enter, a barge 4 may be permanently fixed to the lower level deck 11-1 of the jack-up platform 1, and such vessel 1 could then be used as a normal feeder jack-up, sailing back and forth to a site or a port, picking up components, avoiding the need for complex docking operations and the additional tugs that are then required. This embodiment provides a jack-up platform that may also be self-propelled and, optionally, equipped with a dynamic positioning (DP) system. To this end, thrusters 100 may be provided at an aft part of the hull 10.

Whenever there is a need for maintenance work to an offshore windfarm, the lower level deck 11-1 could be equipped with a barge 4 carrying components that needs to be exchanged or repaired. Next to these components, the barge 4 could be loaded with a land crane for instance, in order to facilitate these maintenance works.

The jack-up vessel 1 in another embodiment might have a couple of smaller auxiliary cranes (not shown) on board in order to transfer smaller components, such as containers and other relatively light equipment. These smaller cranes may also be certified for man-riding. Auxiliary cranes typically range between 5 and 10 tons lifting capacity but may go up to 20 tons, 30 tons or higher.

To optimize the visibility of the crew of the jack-up vessel 1 during the docking operations, the vessel 1 in an embodiment may be able to be steered from one or two additional control cabins 18a, located on the aft of the vessel 1 at opposite sides of the entrance opening 17. This is in addition to a control bridge 18b located at a top level of an accommodation block 19b, situated at the bow of the vessel 1. As docking of the barge 4 is preferably done at the aft of the vessel, as shown in the embodiments of FIGS. 1-6, the vessel operators will be able to control the movements of the jack-up vessel 1 from these two additional control cabins 18a, also referred to as 'doghouses'. These will allow for good visibility over the docking operations.

As the jack-up vessel 1 preferably is used in combination with a main installation vessel, a limited amount of bunks/accommodation may be foreseen. A minimum amount of crew operates the vessel, whereas an additional crew may be provided in order to facilitate the barge 4 docking. Other accommodation may be provided for project management (like a works manager, QHSE manager, lifting supervisor), personnel of the turbine owner, personnel of a client and a Marine Warranty Surveyor, and so on. Preferably, no room is foreseen for a rigging crew, nor turbine technicians, since these can all be accommodated onto the main installation vessel, which normally can accommodate around 60 to 100 people, but in some cases, even well above that number. Whenever the jack-up vessel 1 and a main installation vessel are located next to each other offshore, ready to transfer the components from the jack-up platform 1 to the main installation vessel, a walkway bridge connection or gangway may be first placed between the two vessels, in order to allow the needed personnel to walk from the main installation vessel safely onto the jack-up vessel 1 and vice versa.

The limited requirements for the number of people on board of the invented jack-up vessel 1 allow limiting the accommodation block 19*b* substantially. Where in a normal jack-up vessel, the accommodation block is situated at the bow of the vessel, stretching out completely from the port side to the starboard side, the accommodation block 19*b* of the jack-up vessel 1 can be reduced in size to be placed on either starboard, or port side of the vessel 1 only, as shown in FIGS. 1-6.

When using smaller sized barges 4 to transport turbine components, such as blades, such long blades may overhang from the barge 4 and extend out further as the size of the barge 4. Such blades may be sticking out, either on the aft or over the bow of the barge 4. Some embodiments, in which the accommodation block 19*b* is reduced in size and placed on starboard or portside of the vessel 1, still allow docking a barge 4 with overhanging blades, even if they are sticking out in both directions, without a clash with the accommodation block 19*b*. One could also foresee the blades to be sticking out on the aft side of the jack-up platform 1, if desired.

Having a reduced accommodation block 19*b* on one side of the bow of the vessel 1 may limit visibility for some operations, where operators need to look from the cabin 18*b* to the aft of the vessel 1. Indeed the control cabin 18*b* on the top level of the accommodation block 19*b* may be situated behind one of the legs 12. To increase visibility, the jack-up vessel 1 may be equipped with additional monitoring systems (not shown), such as but not limited to cameras, object detection systems and warnings. Alternatively they may be operated from the doghouses 18*a*, situated on the aft of the vessel 1.

As shown in FIGS. 1-6, an aft hull 10 part of the jack-up platform 1 according to an embodiment comprises the opening 17 in the hull 10 for receiving the barge 4 in the receiving space 15. To facilitate the docking, a jack-up platform 1 is provided wherein the entrance 17 of the receiving space 15 is bordered by two tapered guiding structures 19 in the form of two tapered cantilever arms, provided on each side of the entrance 17 to the receiving space 15. The tapered guiding structures 19 may be foreseen in order to facilitate receiving the barge 4 in the receiving space 15. The tapered guiding structures 19 or 'catcher system' allows docking the barge 4 in higher sea states for instance. The higher the sea states, the larger the motions of a barge 4 will be compared to the motions of the jack-up platform 1, which will be more stable, even in floating modus, compared to the barge 4. Where the jack-up vessel 1, using its optional thruster power, can hold the vessel 1 positioned relatively accurate in a horizontal plane, the barge 4 will be subject to larger horizontal motions, particularly in case it does not have built in thrusters itself and is solely steered and positioned by tugs. The catcher system allows docking a barge 4 having larger motions and therefore the actual width of the docking slot and/or the receiving space 15 on the jack-up vessel 1 may be kept to a minimum, which helps in keeping the jack-up vessel 1 design size as lean as possible. The tapered guiding ends 19, which have a receiving side wider than a receiving space 15 side facilitate the barge 4 to be guided into the relatively narrow receiving space 15 or barge dock. The barge dock or receiving space 15 width can be designed about equal to the maximum foreseen width of the barge 4, allowing some additional space on both sides for a fendering system in order to absorb any shock loadings into the receiving space 15 during the docking procedure and to protect the barge 4 from slamming directly into the steel wall structure (16*s*, 16*b*) while docking.

To facilitate the docking procedures, winches (not shown) may be foreseen on the jack-up platform 1 that operate mooring lines (not shown) for the barge 4, in order to help pulling it into the receiving space 15 or dock. The winches can either be situated at the bow of the jack-up vessel 1. In such an embodiment, messenger wires may run to the aft of the vessel 1 to make an easy connection when the barge 4 arrives at the entrance opening 17. As an alternative at either side of the hull 10, two trolley winches may be foreseen on a rail structure extending along substantially the full length of the receiving space 15 or lower level deck 11-1. At the beginning of the docking procedure these winches or connection points for the mooring lines may be positioned at the aft of the vessel 1. The actual connection points may then be sliding over the rail from the aft to the bow of the vessel 1, while the barge 4 is connected. This will pull in the barge 4 into the receiving space 15 or dock.

In an embodiment of the jack-up platform 1, described further below, wherein an opening is foreseen both at the front and at the bow of the vessel 1, a messenger wire from the barge 4 could be run through the jack-up vessel 1 first. At an outer end, an additional tug could pickup this messenger wire, pull the mooring line through the jack-up vessel 1 and then pull the barge 4 onto the lower level deck 11-1 of the vessel 1 with the mooring line. On an opposite side, one or more tugs may be connected as well to the mooring line in order to guide the barge 4 into the receiving space 15 from one end, while the other tug is pulling on the other end.

According to one invention, the jack-up platform 1 comprises a centralizing system 5 configured to substantially centralize the received or docked barge 4 in the receiving space 15.

Figure 6:
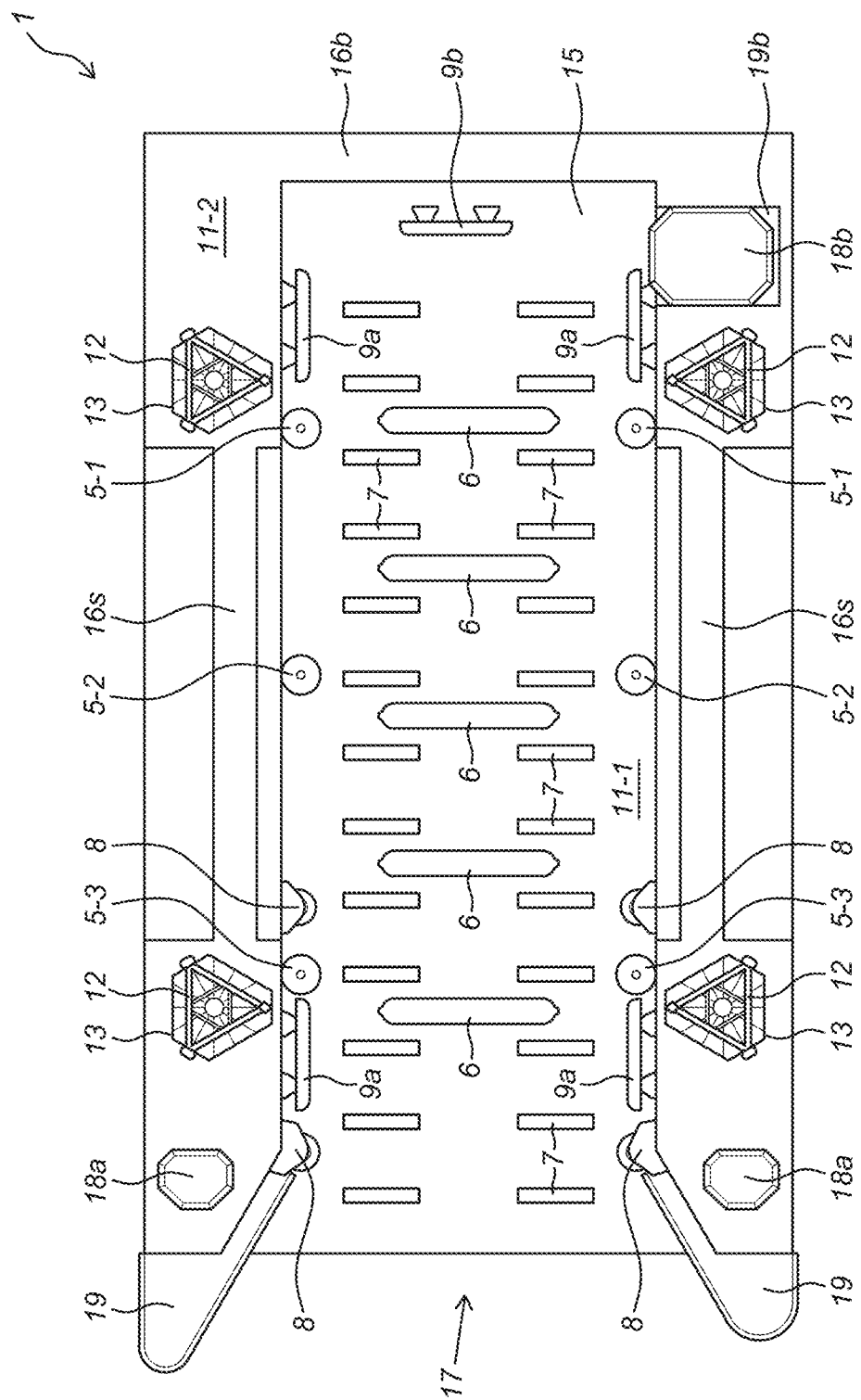
FIG. 6 represents a schematic top view of the jack-up platform shown in the embodiment of FIG. 1.

As particularly shown in FIG. 6, the centralizing system comprises centralizing means 5 provided in the side walls 16*s* of the receiving space 15. The centralizing means can be brought from a retracted position (or retracted extension relative to the surface of each of the walls 16*s*) in which they may not make contact with a hull part of a docked barge 4 to a centralized position (or extended position relative to the surface of each of the walls 16*s*) in which a surface of the centralizing means contacts a hull part of the barge 4 with a non-zero force. Suitable centralizing means 5 comprise a number of inflatable fenders (5-1, 5-2, 5-3) that are provided in each side wall 16*s* of the receiving space 15. Each inflatable fender (5-1, 5-2, 5-3) in a first side wall 16*s* has a corresponding inflatable fender (5-1, 5-2, 5-3) in a side wall 16*s* opposite the first side wall 16*s*. The inflatable fenders (5-1, 5-2, 5-3) cooperate with a pressurizing pump or pumps (not shown) for inflating the inflatable fenders (5-1, 5-2, 5-3) from each deflated retracted position to each centralized position. By adjusting the extension or degree of inflation of the fenders (5-1, 5-2, 5-3) positioned at one side wall 16*s* relative to the extension or degree of inflation of the fenders (5-1, 5-2, 5-3) positioned at an opposite side wall 16*s* allows to centralize a docked barge 4 in the receiving space 15. It should be mentioned that the fenders (5-1, 5-2, 5-3) positioned at one side wall 16*s* may also mutually be inflated to different degrees, if desired. In such embodiment, each fender (5-1, 5-2, 5-3) is operated by its own pressurizing pump. The centralizing system 5 shown in the figures is configured to substantially centralize the received floating barge 4 in the middle of the receiving space 15 in a transverse direction 15-1 of the receiving space 15. As shown, the fenders (5-1, 5-2, 5-3) provided at each side wall 16*s* are arranged from bow to aft in the order fender 5-1, fender 5-2 and fender 5-3. Preferably, the fenders (5-1, 5-2, 5-3) are embodied equal to each other, but they may also mutually differ. The fenders (5-1, 5-2, 5-3) are provided at some distance of each other, preferably equally distributed over the length of the side walls 16*s*. Obviously, the fenders (5-1, 5-2, 5-3) should be positioned such, for instance at such height relative to the lower level deck 11-1, that they may contact a hull part of the barge 4 when docked and floating (in the deballasted state of the jack-up vessel 1).

The centralizing system 5, as described, is able to centralize the barge 4 in a transverse direction after de-ballasting in the middle of the receiving space or dock 15. This feature is important to ensure that the center of gravity of the jack-up platform 1 and the barge 4 after docking still remains relatively close to the geometrical center of the legs 12. A slight misalignment of the barge 4 in the transverse direction of the jack-up vessel 1 may be acceptable when the vessel 1 has sufficient ballast capability in order to counter-act a slight off-centered center of gravity. The centralizing system 5 is operational in ensuring that, in order to make jacking operations as smooth as possible, the trim and the heel angle of the jack-up vessel 1 comprising the docked barge 4 is as close to zero as possible. In this case, when the legs 12 are touching the underwater bottom 2 during the jacking operations, the legs 12 are oriented as vertically as possible within the jacking system requirements.

During the actual docking process, when the barge is floating into the receiving space or dock 15, the inflatable fenders or airbags (5-1, 5-2, 5-3) will be deflated. Because rubber fenders with a larger diameter as the deflated fenders (5-1, 5-2, 5-3) may be connected to the inner side walls 16*s* of the dock 15, the fenders (5-1, 5-2, 5-3) are protected from a potential hit of the barge 4 against the sidewalls 16*s* of the receiving space 15. As soon as the barge 4 is pulled in completely in the longitudinal direction of the vessel 1 and receiving space 15, the fenders or airbags (5-1, 5-2, 5-3) on the sidewalls 16*s* can be inflated. The diameter of the airbags (5-1, 5-2, 5-3) when inflated will preferably be larger than the diameter of the protective rubber fenders. The diameter of the airbags (5-1, 5-2, 5-3), when inflated, may be designed specifically for each different barge size, in particular its width. When inflated on both sides of the barge 4, the inflated diameters should be large enough to push against hull parts of the barge 4 at the two ends, centralizing the barge 4 in the middle of the receiving space 15 or dock in the transverse direction. Once the first part of the de-ballasting phase is completed and the barge 4 is standing completely on the lower level deck 11-1 of the jack-up vessel 1, the inflatable fenders or airbags (5-1, 5-2, 5-3) may be deflated again.

The bottom of the receiving space 15, or the actual lower level deck 11-1, is preferably protected during the docking procedure. The height of the receiving space 15 and the final water level onto the lower level deck 11 of the ballasted jack-up vessel 1 may be designed in such a way that during the docking procedure the bottom of the floating barge 4 cannot bump onto the lower level deck 11-1 of the jack-up vessel 1. Sufficient water level under the bottom of the barge 4 is preferably foreseen in order to cope with the vertical motions of the barge 4 during the docking procedure. Out of safety reasons therefore, rubber floor fenders 6 are connected onto the bottom wall of the receiving space 15, i.e. the lower level deck 11-1. They are provided at some distance of each other, preferably equally distributed over the length of the receiving space 15.

After having positioned the barge 4 at the substantially exact centered location in the receiving space or dock 15, and after deballasting is initiated, the water level on top of the lower level deck 11-1 of the jack-up vessel 1 is reduced and the bottom of the barge 4 will make contact with the lower level deck 11-1. De-ballasting may continue until the substantially full weight of the barge 4 is transferred onto the lower level deck 11-1 of the vessel 1.

The lower level deck 11-1 of the receiving space 15 may comprise support elements in the form of a plurality of wooden blocks 7, next to the above mentioned rubber protection floor fenders 6. If not, the substantially complete weight of the barge 4 would be placed onto the floor fenders 6, which would entail the risk for exploding them. In order for the floor fenders 6 to protect the jack-up vessel 1 and the barge 4 during the docking procedure, and in order to not explode the floor fenders 6 while de-ballasting the jack-up vessel 1, the floor fenders 6 preferably are engineered in a way that the diameter of the floor fenders 6 is larger than the height of the wooded blocks 7 if uncompressed. When the barge 4 hits the rubber floor fenders 6 during the docking procedure, the floor fenders 6 are preferably stiff enough not to be compressed until a level that the wooden blocks 7 are exposed, preventing damage to occur to these wooden blocks 7.

During the de-ballasting procedure, the barges keel may make a first contact with the rubber floor fenders 6 provided on the lower level deck 11-1. Because the barge 4 will still have heave motions at that moment, the rubber floor fenders 6 may take up part of the loads of the barge 4 still moving up and down. This situation may be maintained until the moment the floor fenders 6 are de-compressed to a level where their diameter actually becomes smaller than the height of the wooden blocks 7. At that point in time the wooden blocks 7 take over the load of the barge 4, and the floor fenders stay decompressed. Since now substantially all the load of the barge 4 is carried by the wooden blocks 7, these wooden blocks 7 protect the floor fenders 6 from overloading and breaking.

Once, during the de-ballasting procedure of the jack-up vessel 1, sufficient weight of the barge 4 has been transferred onto the wooden blocks 7, the inflatable fenders (5-1, 5-2, 5-3) provided at the sidewalls 16*s* of the receiving space 15 may be deflated, since the barge 4 is then provided in a substantially stable position relative to the receiving space 15.

During the undocking phase of the barge 4, the same fender systems (5-1, 5-2, 5-3, 6) may be used in a similar way to provide for a safe and controlled undocking procedure. Before the ballasting procedure starts to undock a barge 4, mooring lines may be again connected between the barge 4 and one or more tugs. The inflatable fenders (5-1, 5-2, 5-3) provided at the sidewalls 16s of the receiving space 15 may be inflated again. While ballasting, the barge 4 will at some moment lose its contact with the wooden blocks 7. The floor fenders 6 on the bottom of the receiving space 15 may then be decompressed to provide a larger diameter than the height of the wooden blocks 7. As now the barge is floating again inside the receiving space 15, said floor fenders 6 may prevent shock loads in the first stages when the barge 4 is still floating, but the water level under the barge 4 is not sufficient yet to prevent the vertical moving barge 4 from slamming back onto the lower level deck 11-1. Continuing the ballasting procedure, increasing the water level in the receiving space 15 of the jack-up vessel 1, the barge 4 will finally lose contact with the floor fenders 6 and will be floating again. After the completion of the ballasting, the inflatable fenders (5-1, 5-2, 5-3) may be deflated, and the mooring lines or trolley system holding the barge 4 in the longitudinal direction in position may be released. A tug is then ready to pull out the barge 4 from the receiving space 15.

In order to protect the jack-up vessel 1 and the barge 4 from being damaged during the docking and undocking process, additional fendering may be foreseen in some embodiments.

In one embodiment, the jack-up platform 1 further comprises fenders (not shown) provided at an outer surface of the hull 10 of the vessel 1. Suitable outside fenders may comprise normal Yokohama fenders for instance. They are provided in order to protect the outer shell of the vessel 1 in case the docking procedure goes wrong and the barge 4 would bump onto the jack-up vessel 1. This external fendering is rather a protection measure and is not actually required for the docking procedure itself.

In another embodiment, the jack-up platform 1 may be provided with additional fenders provided at a side wall surface of the entrance 17 to the receiving space 15, preferably rolling fenders 8. They may be provided on the extended tapered outriggers 19, in the form of build-in roller fendering 8. Whenever the barge 4 would land on one of the two tapered outriggers 19, the rolling fenders 8, or fenders of any other type or combination, could act as shock absorbers, but also could have a rolling mechanism in place in order to facilitate the barge 4 being pulled into the receiving space 15 of the vessel 1.

In a third embodiment, the jack-up platform 1 further comprises fenders provided at a side wall and/or a bow surface of the receiving space 15, preferably static rubber fenders or shock absorbers (9a, 9b). This provides further protection to the inside of the jack-up vessels dock 15, when the barge 4 is being docked. The barge 4 may have slight sideway motions during the docking procedure and could bump into the inner side walls 16s of the receiving space 15.

In an embodiment where mooring lines are connected at the barge 4 to winches at the bow of the vessel 1, additional rolling fenders 8 may be attached to the sidewalls 16s of the receiving dock 15 in order to facilitate guiding in the barge 4 to its final docking position.

In an embodiment where at both sides of the inner receiving dock wall 16s a trolley system is provided that on both sides is connected with mooring lines attached to the sides of the barge 4, sideway motions of the barge 4 may be mitigated by introducing a certain amount of tension in the mooring lines provided at both sides of the barge 4. If this tension is kept during the retraction of the trolleys towards the bow of the jack-up vessel 1, sideway motions may be mitigated or reduced throughout the docking procedure and this may prevent the barge 4 from bumping into the sidewalls 16s of the receiving space 15.

Bow rubber fendering 9b may be foreseen at the inner dock wall 16b at the bow to prevent shock loadings into the hull 10 at the moment the barge 4 is pulled completely into the receiving space 15. The bow rubber fenders 9b also help in centering the barge 4 in the longitudinal direction of the receiving space 15. When either using the trolley system or using winches at the bow of the vessel 1, winches will be present at the bow of the vessel 1 to hold the barge 4 in place in the longitudinal direction after the barge 4 is floated into the receiving space 15 but is still in a floating modus. This will allow the barge 4 to maintain the same position in the longitudinal direction of the receiving space 15 when in a next step, by de-ballasting, actual contact will be made between the lower level deck 11-1 and the bottom of the barge 4. In this way, longitudinally, the barge 4 may be positioned at a substantially centralized location, preferably against the bow fenders 9b located at the inner dock wall 16b at the bow in the longitudinal direction after de-ballasting. Once the barge 4 is pulled in completely into the receiving space 15 and onto the lower level deck 11-1 and secured, the mooring lines connecting the barge 4 to the tug(s) may be connected.

The fenders 9a provided at the side walls 16s of the receiving space 15 extend into the receiving space 15 over a distance that does not interfere with the centralizing system, comprising the inflatable fenders (5-1, 5-2, 5-3) when activated. In other words, the extension into the receiving space 15 of the inflatable fenders (5-1, 5-2, 5-3) in the activated state should be larger than the (substantially constant) extension of the fenders 9a provided at the side walls 16s into the receiving space 15.

Figure 7:
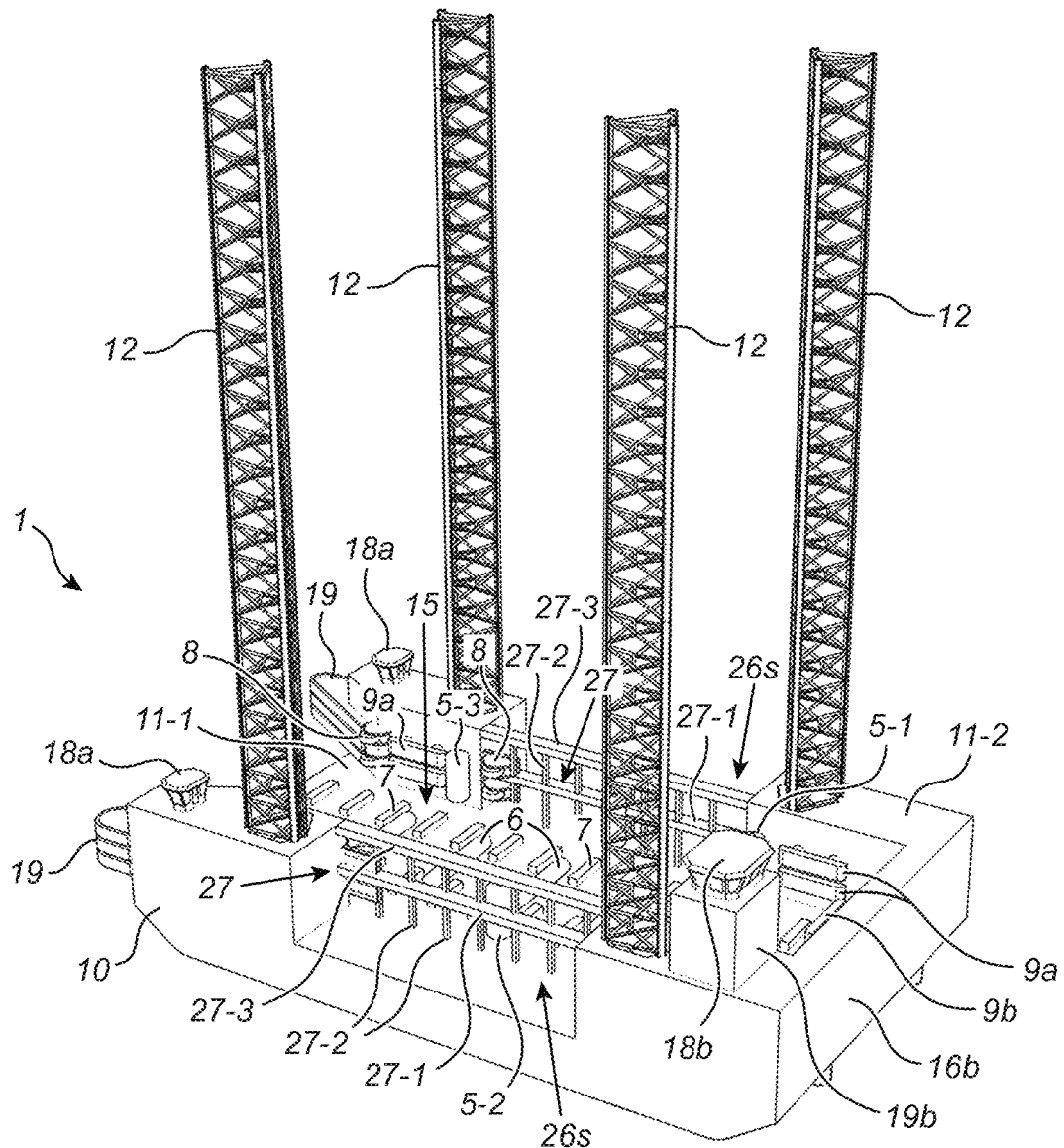
FIG. 7 represents a schematic perspective view of a jack-up platform in accordance with another embodiment of the invention.
Figure 8:
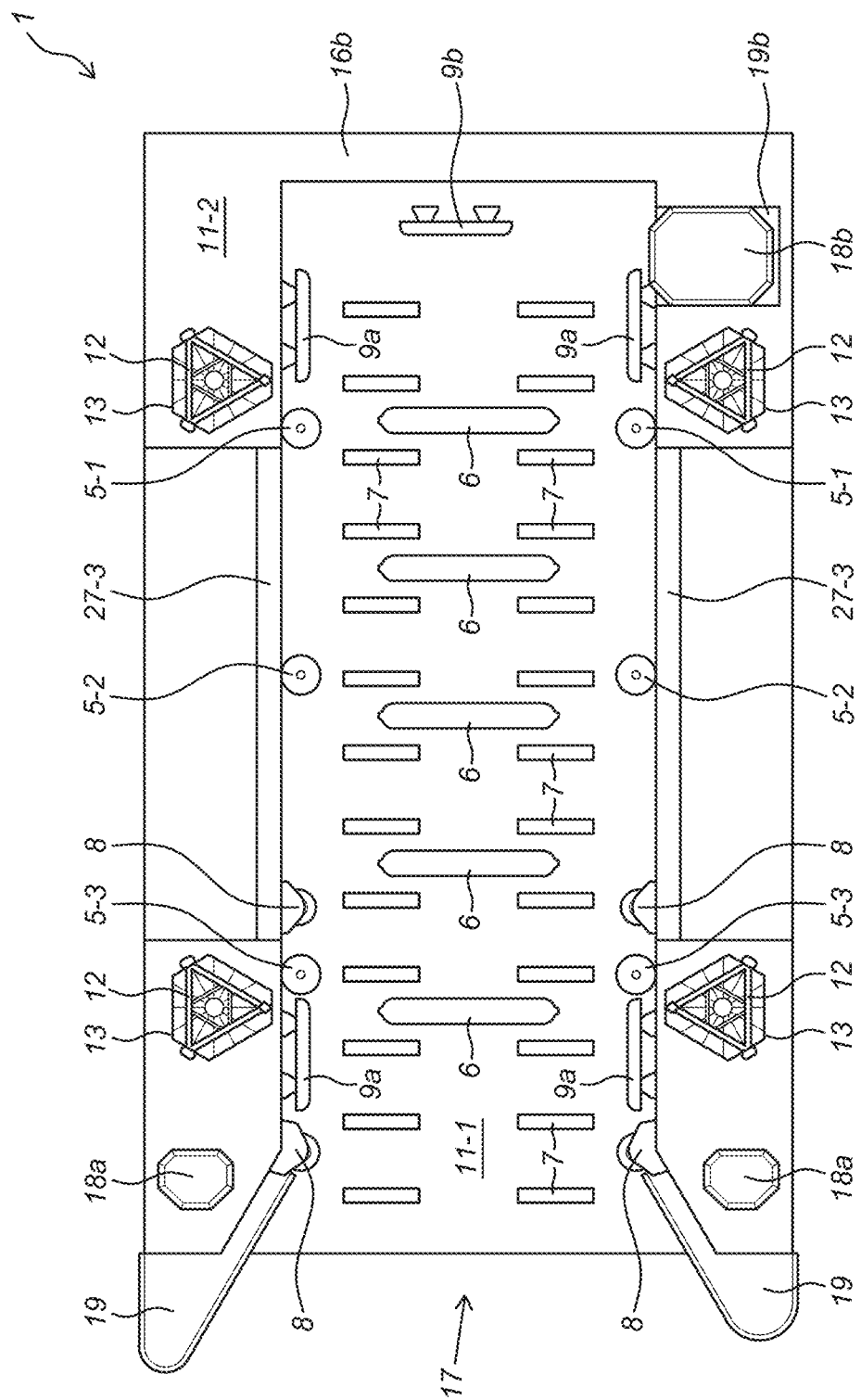
FIG. 8 represents a schematic top view of the jack-up platform shown in the embodiment of FIG. 7.

With reference to FIGS. 7 and 8, another embodiment of the jack-up platform 1 is shown in a perspective and a top view, respectively. The vessel 1 comprises many features already disclosed in the context of the description of the embodiment shown in FIGS. 1-6. We incorporate the description of these features in the description of the present embodiment, in order to avoid any unnecessary repetition.

The embodiment shown in FIGS. 7 and 8 differs from the embodiment shown in FIGS. 1-6 in that the hull 10 comprises one or more further openings 26s at both sides of the hull 10. As shown, the side walls 16s of the hull 10 of the embodiment of FIGS. 1-6 are replaced by two openings 26s provided at both sides of the hull 10. The lower wall of the openings 26s is level with the bottom surface of the lower level deck 11-1.

The side openings 26s are stiffened with a framework 27 of mutually interconnected horizontal stiffening ribs 27-1 and vertical stiffening ribs 27-2. This allows providing the hull 10 with enough stiffness and strength. The side openings 26s provided with the stiffening framework 27 allows water to freely enter the receiving space 15. The framework 27 is at a top part thereof provided with a crossing walkway 27-3. Although not shown, the framework 27 may also be provided with panels for breaking incoming waves.

Figure 9:
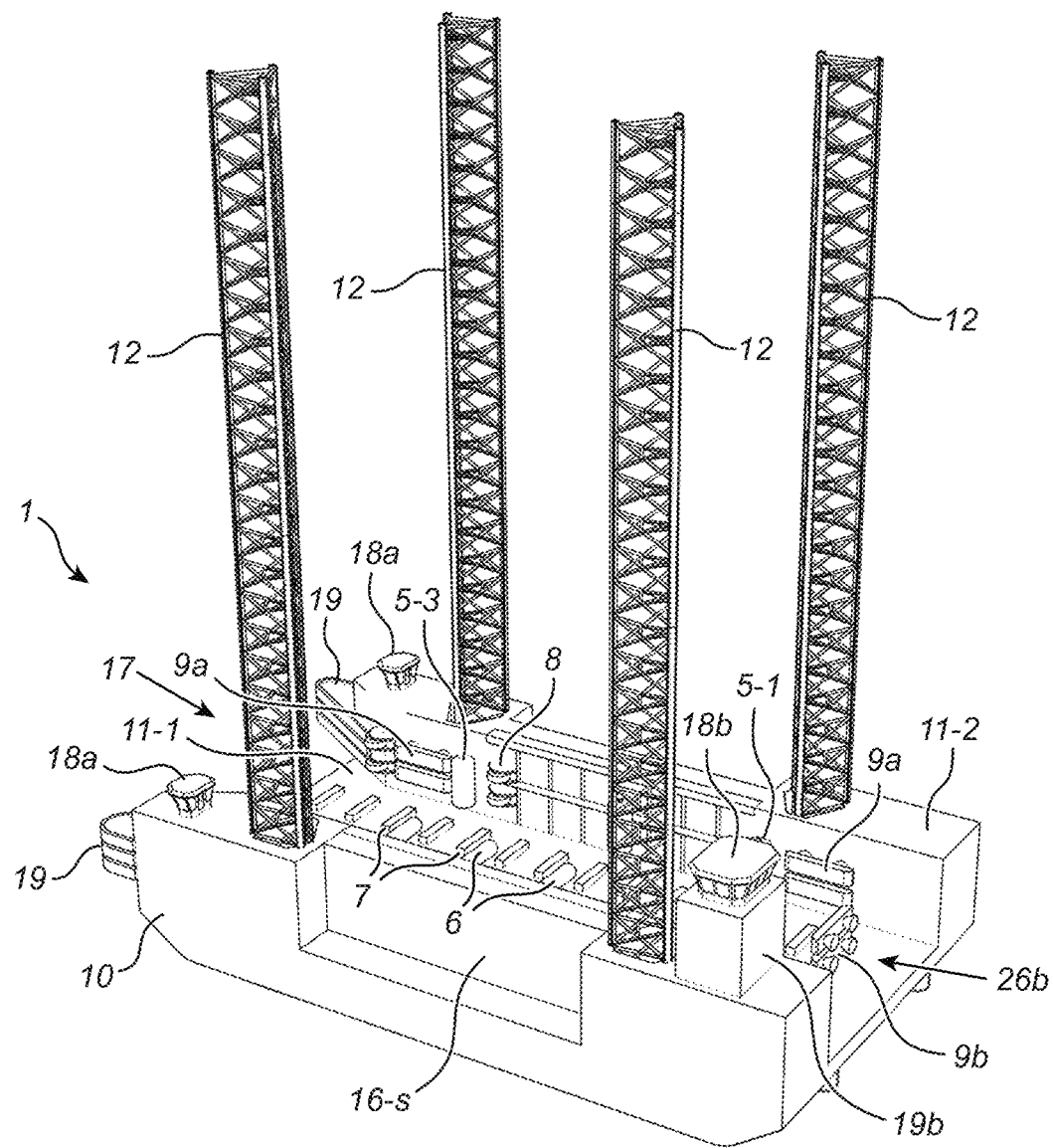
FIG. 9 represents a schematic perspective view of a jack-up platform in accordance with yet another embodiment of the invention.
Figure 10:
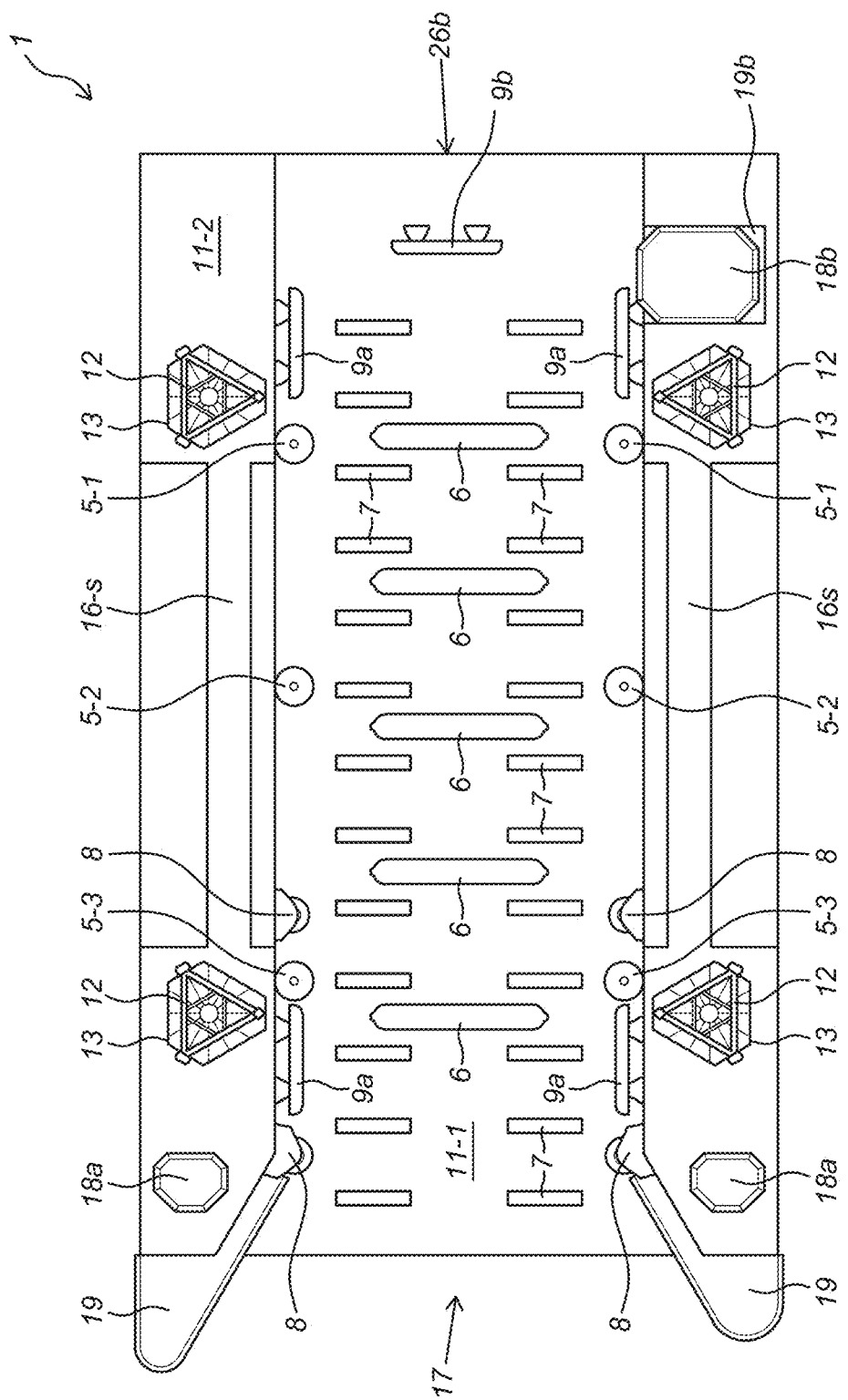
FIG. 10 represents a schematic top view of the jack-up platform shown in the embodiment of FIG. 9.

The embodiment shown in FIGS. 9 and 10 differs from the embodiment shown in FIGS. 1-6 in that the hull 10 comprises one further opening 26b of the hull 10 is provided at the bow of the hull 10. This embodiment has solid side walls 16s, as in the embodiment of FIGS. 1-6. As shown, the bow wall 16b of the hull 10 of the embodiment of FIGS. 1-6 is replaced by an opening 26b provided at the bow of the hull 10. A lower wall of the bow opening 16b is level with the bottom surface of the lower level deck 11-1. The bow opening 16b allows water to freely enter the receiving space 15 and provides an alternative entry of exit for a barge 4 to be docked.

Figure 11:
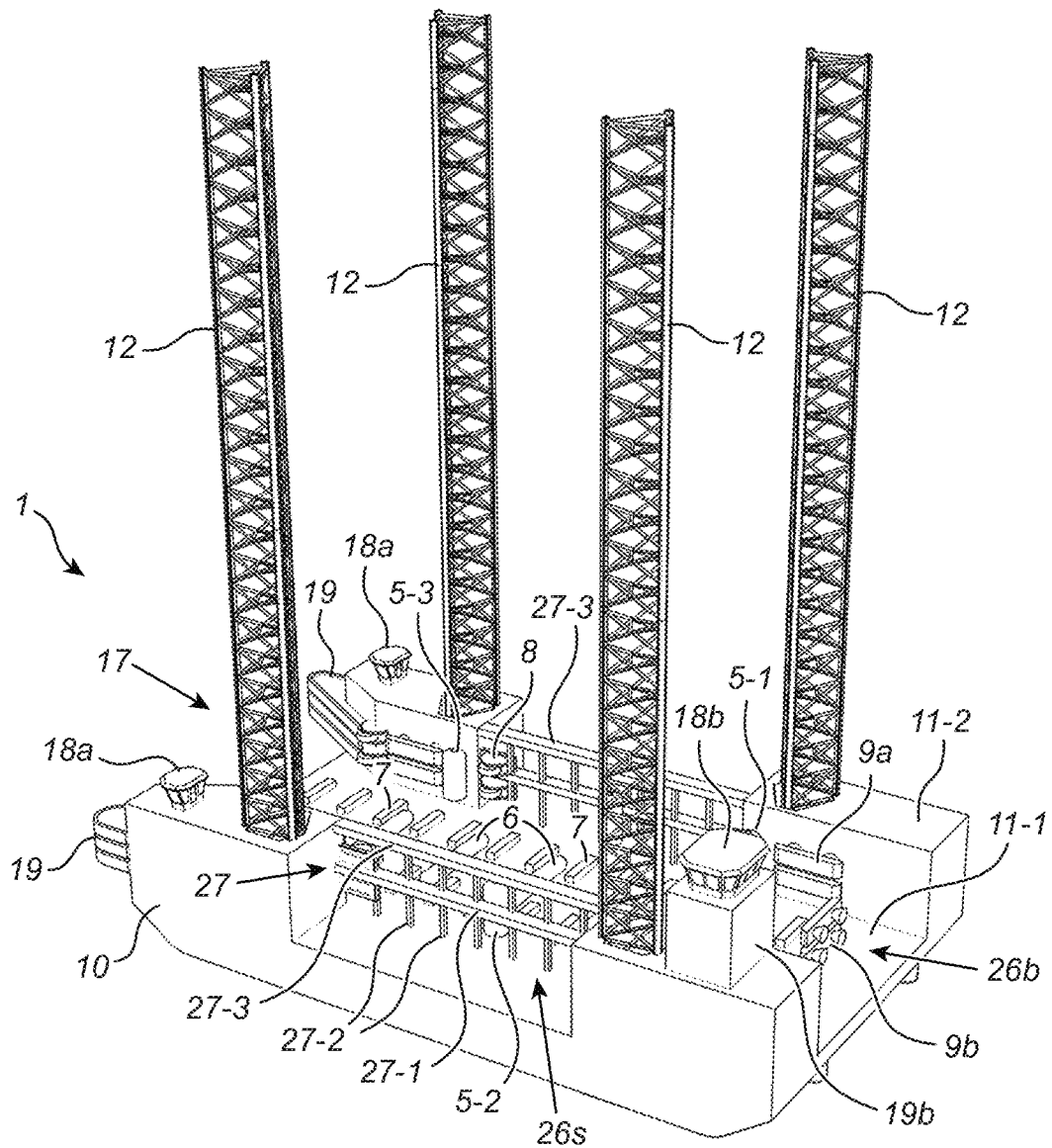
FIG. 11 represents a schematic perspective view of a jack-up platform in accordance with yet another embodiment of the invention.
Figure 12:
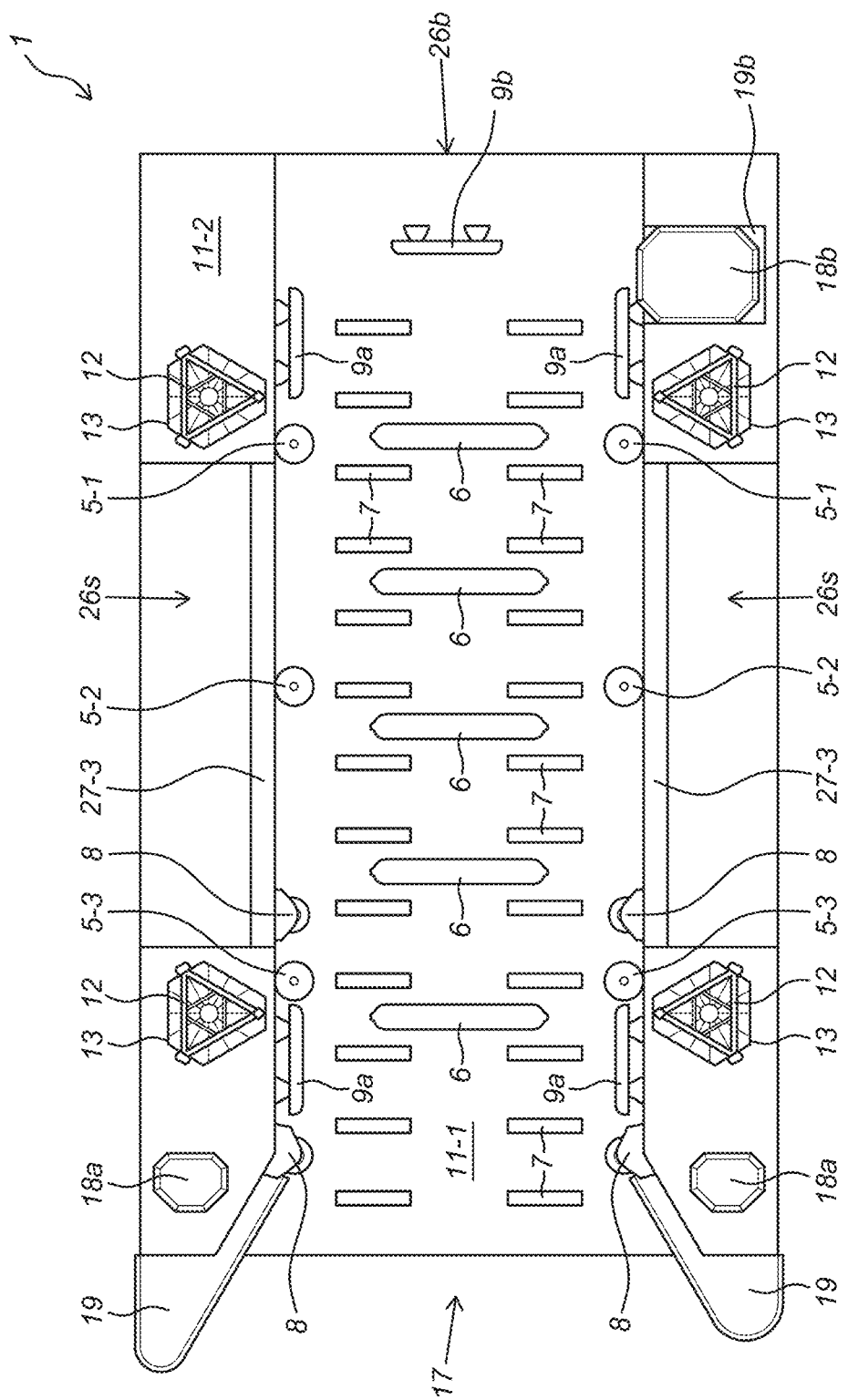
FIG. 12 represents a schematic top view of the jack-up platform shown in the embodiment of FIG. 11.

The embodiment shown in FIGS. 11 and 12 differs from the embodiment shown in FIGS. 1-6 in that the hull 10 comprises one or further openings 26s at both sides of the hull 10, as well as one further opening 26b of the hull 10 provided at the bow of the hull 10. This embodiment is a combination of the embodiments shown in FIGS. 7, 8, 9 and 10, to which description we refer.

The invented jack-up platform 1 can advantageously be used for facilitating the placement offshore of wind turbine equipment using a main installation vessel. As such a main installation vessel may stay offshore during the installation of an offshore windfarm, and so does not need to sail back and forth to and from a port or site, installation cycles may be increased. This may allow projects to be constructed quicker as is currently the standard in the state of the art. This is made possible by using dedicated transport and installation jack-up vessels. If desired, a sufficient number of barges 4 may be deployed in parallel, thereby providing a continuous flow of new turbine components to install on-site. Further, the docking of the barges 4 may also be performed completely independent of the critical installation path of the main installation vessel. Indeed, there generally is sufficient time available for the invented jack-up vessel 1 to undock and dock a new barge 4, while the main installation vessel is allowed to finish up the works on a previous site or location.

A method for facilitating the offshore installation of a wind turbine using the invented jack-up platform 1 as illustrated in the figures.

Figure 13:
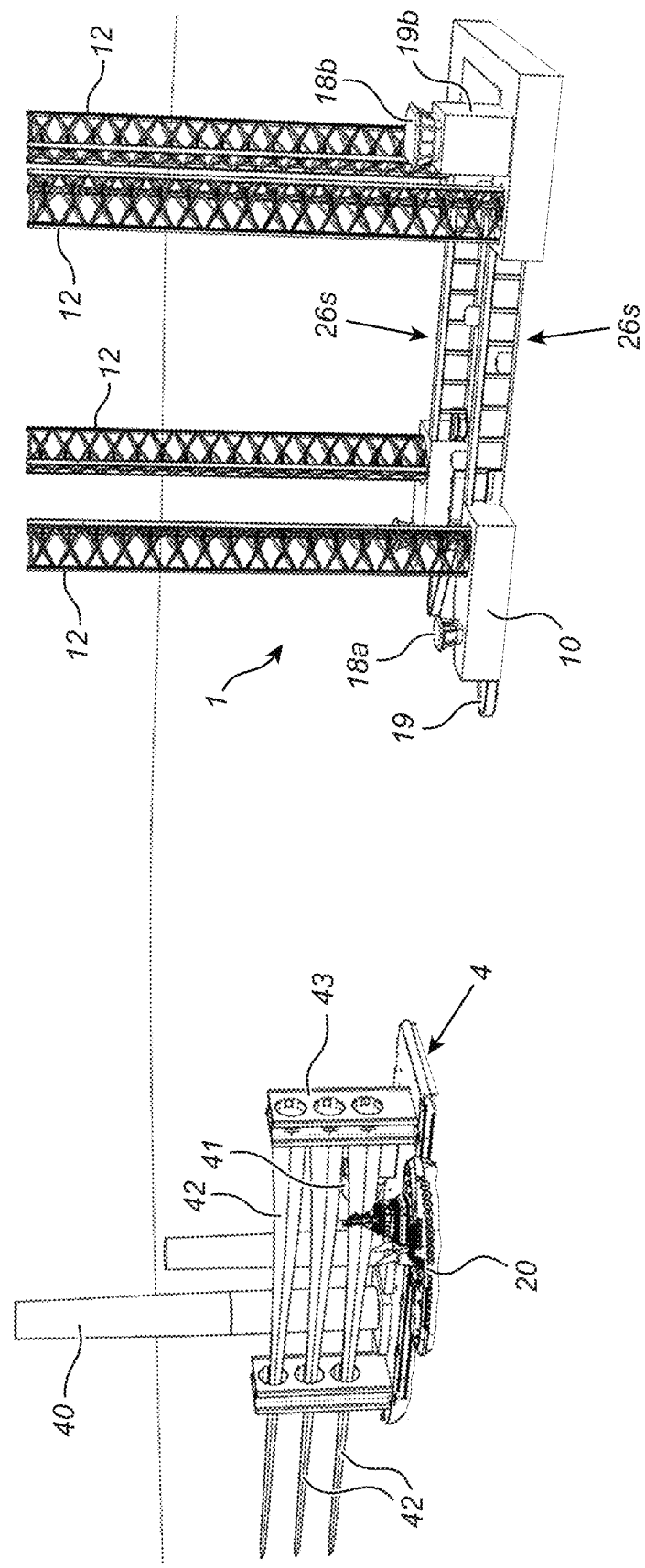
FIG. 13 represents a schematic perspective view of a step in the method of facilitating the offshore installation of a wind turbine, using the jack-up platform according to an embodiment of the invention.
Figure 14:
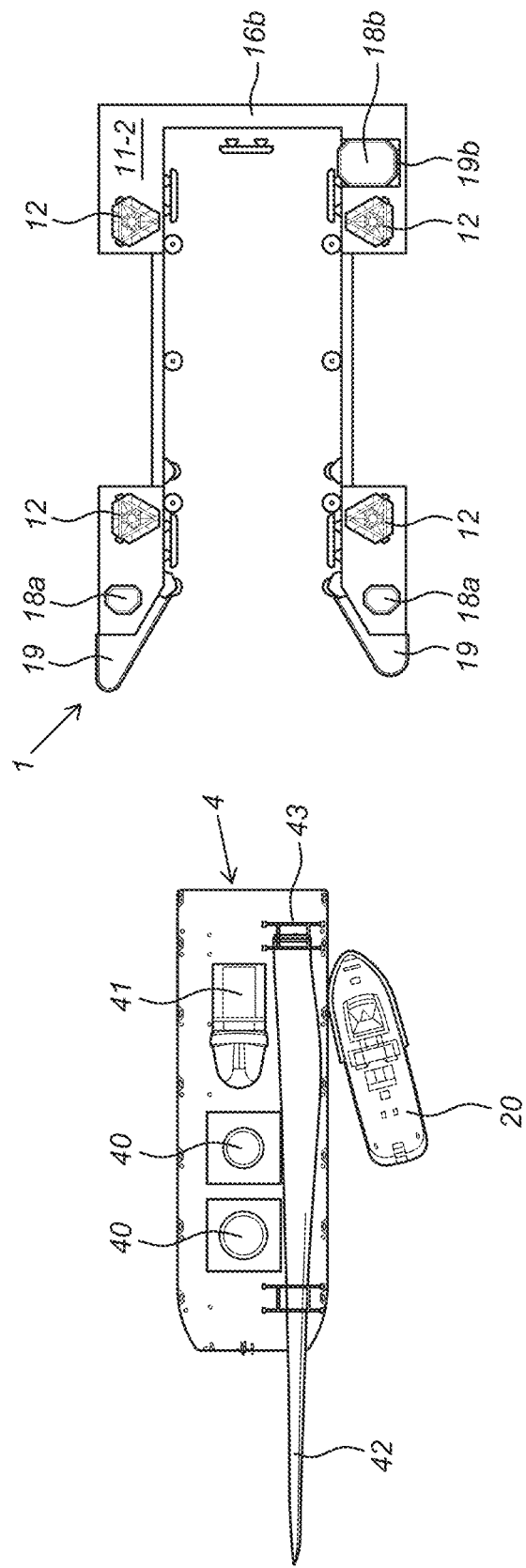
FIG. 14 represents a schematic top view of the method step shown in FIG. 13.

In a first step, a barge 4 is positioned close or next to a load-out area, such as a port, and several wind turbine generator components, such as foundation piles or mast segments 40, one or more nacelles 41, and a number of wind turbine blades 42 are loaded onto the deck of the barge 4. The components (40, 41, 42) may be sea fastened by providing them in a suitable storage, such as the rack 43 shown in FIG. 13 for sea fastening the wind turbine blades 42. After the loading the barge 4 and checking whether all the components (40, 41, 42) are well secured for sea transport, a tug 20 will typically tow the barge 4 from the loadout location to the offshore wind installation area, and in the vicinity of a jack-up platform 1. Upon arrival of the ocean-going tug 20 and the transport barge 4 at the offshore wind farm site, an offshore assist tug (not shown in the figures) may be attached to a feeder barge who will assist the barge 4 and the tug 20 with the final maneuvering within the offshore windfarm and with positioning of the feeder barge next to the jack-up vessel 1, which will be waiting in a floating condition, as shown in FIGS. 13 and 14.

At this stage, the jack-up platform 1 may be comparable to a normal jack-up vessel which is in a floating condition. Where a normal jack-up vessel has a main deck, of which it is not the intention to be submerged, the jack-up vessel 1 according to the invention has a higher level deck 11-2 and a lower level deck 11-1, where it is intended to submerge the lower level deck 11-1. At a first draft, both the higher and lower level decks (11-1, 11-2) will not be submerged under water. Whenever the barge 4 is positioned in the vicinity of the jack-up vessel 1, the barge 4 docking operations can start. The jack-up vessel 1 has the capability of taking in a maximum amount of ballast water using pumps into its hull 10. By activating the ballast pumps, the jack-up vessel 1 will take on more weight by the added water mass, causing the draft to increase to a second and maximum draft, or any intermediate stage draft. In practice, this means that the vessel's 1 hull 10 will be lowered deeper into the water. A sufficient amount of ballast has to be added so the lower level deck 11-1 of the vessel 1 will be submerged underwater, while the upper level deck 11-2 of the vessel 1 will stay dry and above the water level. Sufficient water column needs to be created on top of the lower level deck 11-1, such that the height of the water column is minimally, but preferably larger, than the draft of the barge 4.

The submerging principle of the lower level deck 11-1 may be compared to the main working principle of a semi-submersible vessel. The lower the center of gravity of the vessel, the more stable the vessel will be. Therefore, semi-submersible vessels are known to be very seaworthy and stable; when submerged the vertical center of gravity will be close to the waterline or even under the waterline. The jack-up vessel 1 has a certain amount of jack-up legs 12 that stick out vertically relatively high above the waterline. Since these legs 12 represent a significant amount of mass, the center of gravity and stability of the submerged jack-up vessel 1 at the higher draft or drafts in between the lower and higher draft, may be less favorable compared to the same vessel 1 without having the legs 12. In some conditions therefore, it may be preferred to lower the legs 12 as part of the ballasting process until a level where the legs 12 can however not touch the underwater bottom or seabed level, while the vessel is still floating. Lowering the legs 12 will actually lower the vertical center of gravity and may further stabilize the jack-up vessel 1, although relatively large part of the total vessel mass, including ballast water, is already situated under the waterline (30-1, 30-2).

The whole or part of the ballasting procedure of the jack-up platform 1 from a low draft 30-2 to a high draft 30-1 does not need to start when the barge 4 has arrived in the vicinity of the vessel 1.

The vessel 1 could already be in a position of high draft 30-1, whenever possible, before the loaded barge 4 arrives. The jack-up vessel 1 indeed is able to survive in severe sea conditions when being in this high draft floating condition.

To facilitate water flow onto the lower deck during the ballasting procedure, and as the length of barges 4 is usually larger than their width, it makes sense to provide an opening (17, 26b) in the aft or bow of the jack-up vessel's 1 hull 10, having about the size of the width of the barge 4. This implies that the jack-up vessel 1 design preferably should be such that the distance between the legs 12 in the transversal direction of the vessel 1 should at least accommodate the width of the intended barge 4. Alternatively, potential openings on the side of the jack-up platform 1 could also serve this purpose, which in the latter case requires the distance between the legs 12 in the longitudinal direction to be minimally equal to either the width of the barge 4, but preferably the length of the barge 4.

Figure 15:
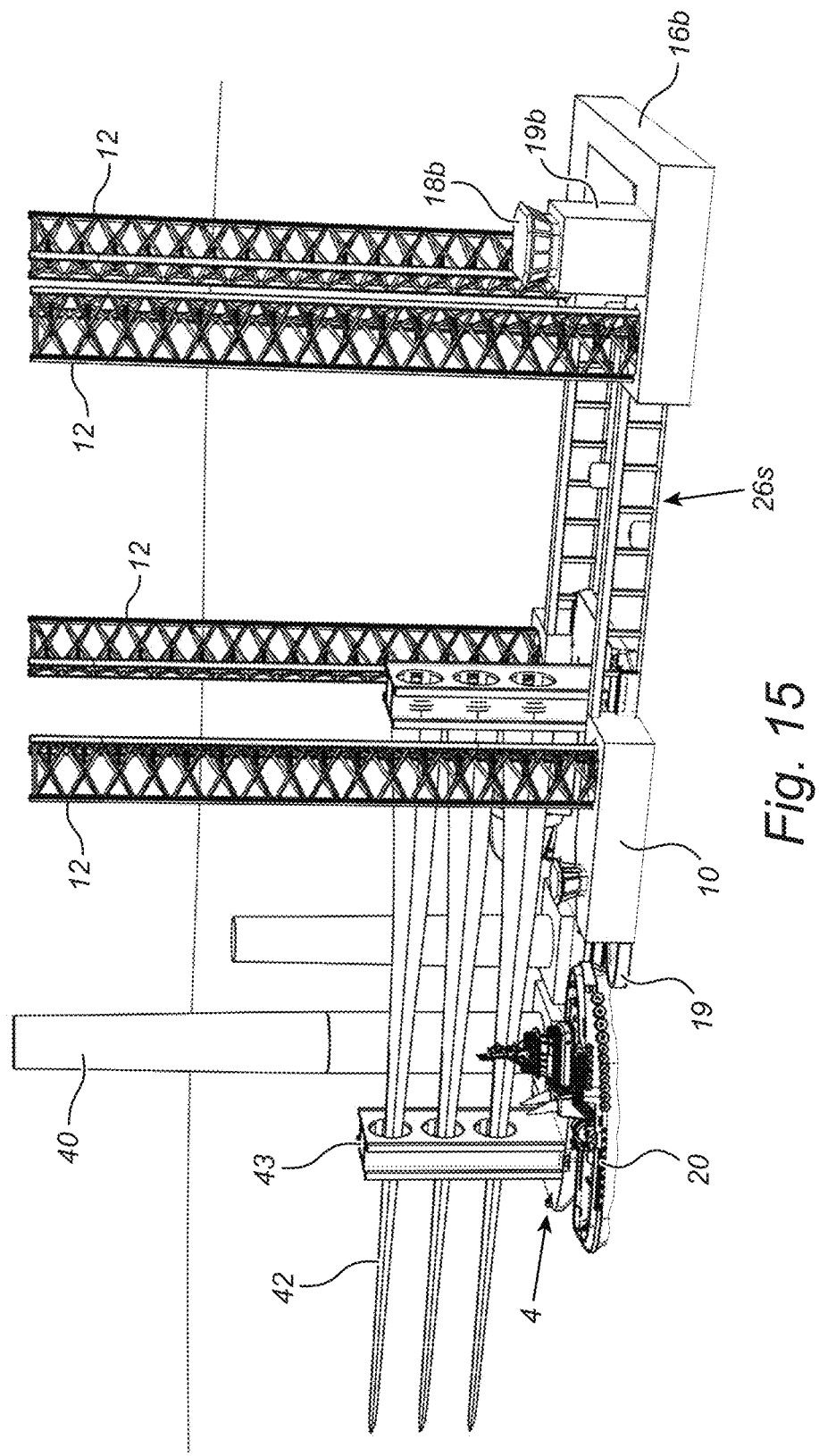
FIG. 15 represents a schematic perspective view of another step in the method of facilitating the offshore installation of a wind turbine, using the jack-up platform according to an embodiment of the invention.
Figure 16:
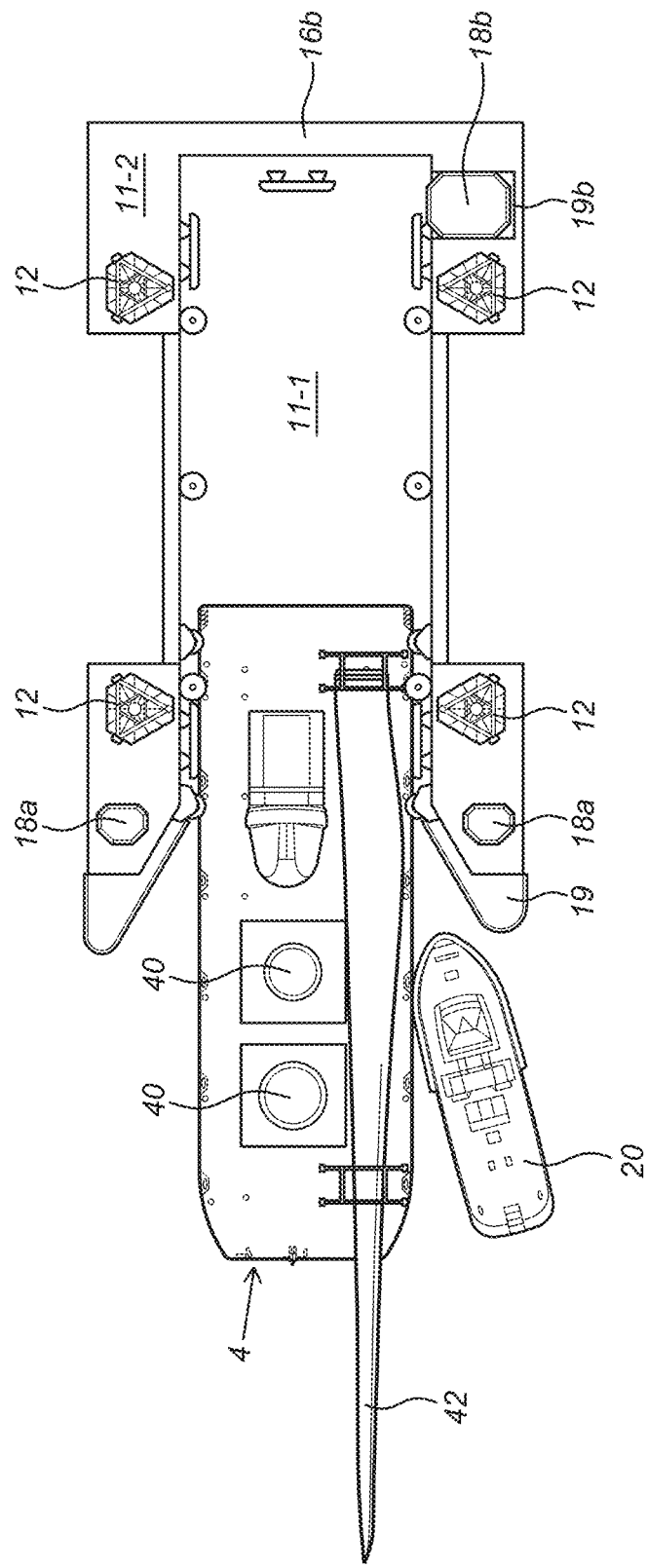
FIG. 16 represents a schematic top view of the method step shown in FIG. 15.

Once the jack-up platform 1 is ballasted to its second floating configuration at the high draft 30-1, the barge 4 is floated onto the submerged lower level deck 11-1 into a position where the bottom of the barge 4 is partly positioned right on top of the lower level deck 11-1. This step of the method is shown in FIGS. 15 and 16.

Figure 17:
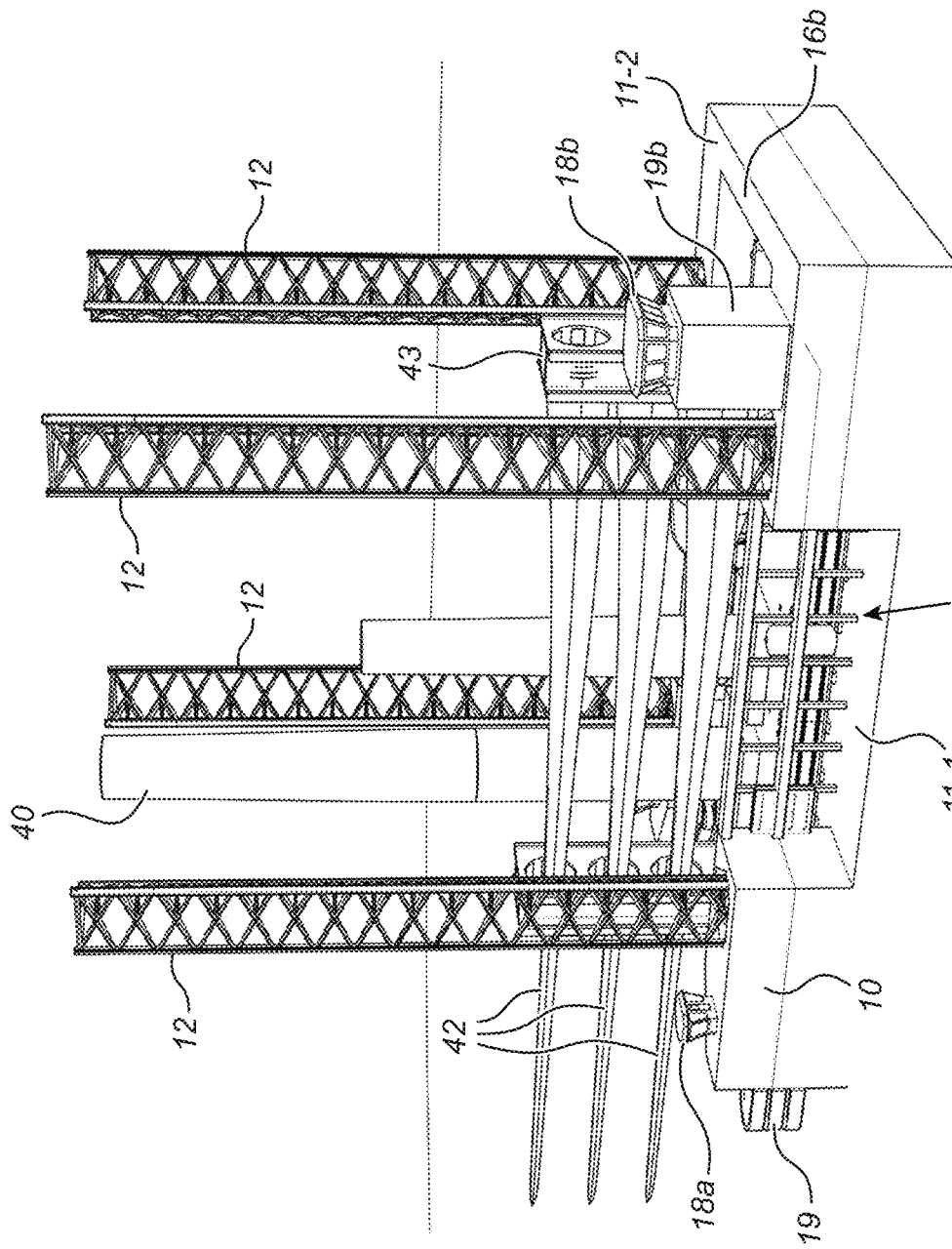
FIG. 17 represents a schematic perspective view of yet another step in the method of facilitating the offshore installation of a wind turbine, using the jack-up platform according to an embodiment of the invention.
Figure 18:
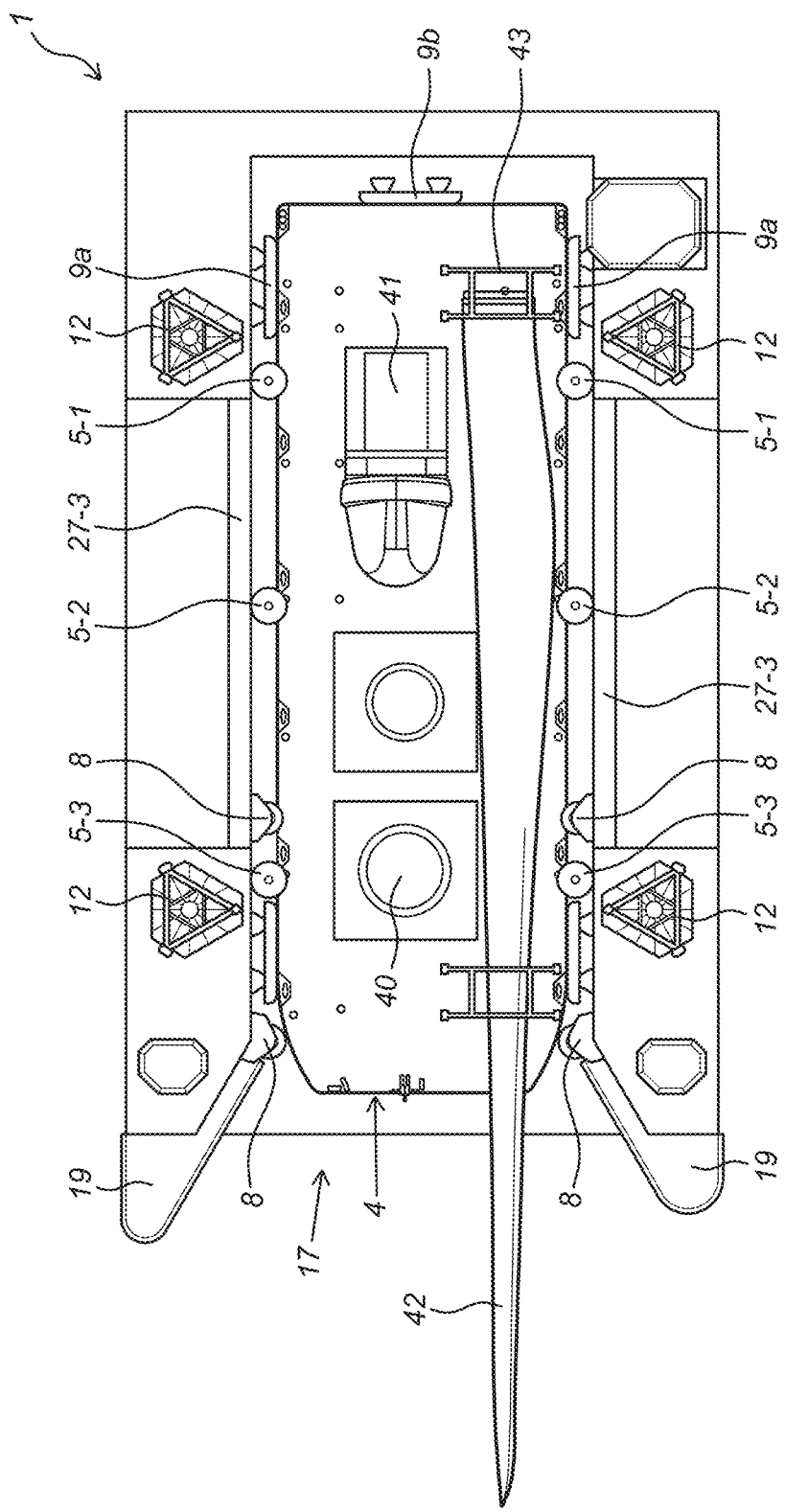
FIG. 18 represents a schematic top view of the method step shown in FIG. 17.

Once the barge 4 is in position over the lower level deck 11-1 of the submerged jack-up vessel 1, the tug 20 or additional tugs may be disconnected. The barge 4 may then be pulled further inside the receiving space 15 by mooring lines connected to winches to a position shown in FIGS. 17 and 18. The inflatable airbags (5-1, 5-2, 5-3) provide on the side walls 16s of the receiving space 15 are then inflated to centralize the floating barge 4 and hold the barge 4 stationed on the correct horizontal position relative to the receiving space 15. At this stage, a certain water column will be present between the top of the lower level deck 11-1 of the receiving space 15 and the bottom of the barge 4. This means that the barge is at this stage floating on top of the submerged lower level deck 11-1. No connection has been made yet between the two bodies—the receiving dock 15 and the barge 4—in the vertical direction.

During the docking procedure, the barge 4 may be steered by tugs and winches, but the barge 4 may also be provided with built-in thrusters, so it can maneuver partly or completely independent on its own into the receiving dock 15. A shown in FIGS. 17 and 18, the docking procedure is preferably carried out with the jack-up platform 1 in a floating position. Where other similar concepts are first putting their legs on to the seabed before the docking procedure starts, the invented jack-up platform preferably performs its complete docking and undocking process in a floating vessel modus. This will allow minimizing the size of the jack-up vessel 1 to the required size, including a well-dimensioned jacking system 13, based on the dimensions of the barge 4 and a total weight of the barge 4, including the components (40, 41, 42, 43). State of the art jack-up legs 12 and the jacking system 13 are usually constructed in order to be loaded in a substantial vertical direction only, with limited capability of taking external horizontal loads. When docking a barge 4 while the legs 12 are on the underwater bottom 2, with the hull 10 still under the water line, the horizontal wave loading would imply to design for a stronger and larger jacking system 13 as required for normal operations, which would increase the vessel size significantly. Further, the vessel stability needs to be guaranteed having these larger legs 12. Because the invented jack-up platform 1 preferably docks a barge 4 in a floating modus by ballasting down to a larger draft, without having its legs 12 touching the underwater bottom 2, limited or no forces at all will go into the jacking system 13 during the docking phase at the larger draft. The jack-up vessel 1 may further de-ballast again after taking the barge 4 to its initial and smaller draft before jacking operations will take place. This limits the amount of external horizontal forces that go into the hull 10 during the initial jacking operations when the legs 12 are touching the underwater bottom 2 and the hull 2 is still in the water. Jacking operations and the forces going into the hull 10 during the initial phase when the legs 12 are on the underwater bottom 2 but the hull 10 is still in the water may be compared to the forces experienced by a state of the art jack-up vessel.

As the jack-op vessel 1 is in a floating condition as well, it may be held in place by the vessel operators in a so-called joystick mode, where position keeping is done manually. The jack-up vessel 1 may be equipped with an automated Dynamic Positioning (DP) system, although such a DP system could act in an opposite way as desired whenever an unexpected external force comes into the system, different than normal waves. The advantage of being in joystick mode during the docking procedure is that the jack-up vessel's 1 operator could make slight heading or positioning adaptations to counteract the less controllable barge 4. Moreover, docking operations may be aborted at any time, if needed. Even though the barge may already be connected to the jack-up vessel 1 through lines and winches, these connections preferably may comprise a safe quick-release function whenever needed, in order for the tug 20 to pull the barge 4 away from the jack-up platform 1 in case of emergency.

Whenever the barge 4 is positioned on top of the lower level deck 11-1 of the vessel 1, but is still in floating modus, the jack-up platform 1 may start up its ballast pumps in reverse in order to de-ballast the jack-up platform to a lower draft 30-2. By doing this, the water will be pumped out of the ballast tanks situated in the hull 10 of the vessel 1, and the overall mass of the vessel 1 will be reduced. Consequently, the draft will be changed from a higher draft 30-1 back To a lower draft 30-2, or an intermediate draft in between.

When the hull 10 of the jack-up vessel 1 is raised partly out of the water again, the water column on the lower level deck 11-1 will be slowly reduced until the water column has the same height as the draft of the barge 4. At that point in time, the bottom of the barge 4 and the top of the lower level deck 11-1 will make contact with each other. The floor fenders 6 provided on the lower level deck 11-1 will act as a shock damper when the first contact is made. The wooden blocks 7, also provided on the lower level deck 11-1 will act as a support basis for the barge 4, which prevents any steel-to-steel contact happening between the two vessels 1 and 4. Also, the wooden blocks 7 have a relatively high coefficient of friction, which will allow that in the next phases during the transport, the barge 4 may not slight sideways easily. By continuing further de-ballasting, the water column on the lower level deck 11-1 of the vessel 1 will continue to reduce, until all water is removed. At that stage, the full weight of the barge 4 and its cargo will be standing on the lower level deck 11-1 of the floating vessel 1. It is not necessary to remove all the water and in an embodiment of the method not all water needs to be removed from the lower level deck 11-1 before performing the next step.

After the barge 4 has been loaded onto the lower level deck 11-1 is a stable centralized position, the jack-up platform 1 may move to its final position in order to facilitate the installation of the wind turbine components (40, 41, 42). This transit can be done completely on the vessel's own keel, meaning the vessel 1 is then equipped with sufficient thrusters 100 in order to sail completely on its own. As a variation, the vessel 1 could also be towed to its next location with the help of tugs (not shown). Depending on the water depths and the length of the final transit during the transit, there is the option of keeping the legs 12 lowered or, if needed, to raise them back up, either completely or partially. For safety reasons the docking process in this particular example was done at a location away from the final installation position. This is because a pre-installed foundation 45 and/or another jack-up vessel might be already present at the installation location. In another application, where no fixed structure is yet in place, one could dock the barge 4 immediately at the final position of the jack-up vessel 1, avoiding the need for this step, i.e. repositioning of the jack-up vessel 1.

Figure 19:
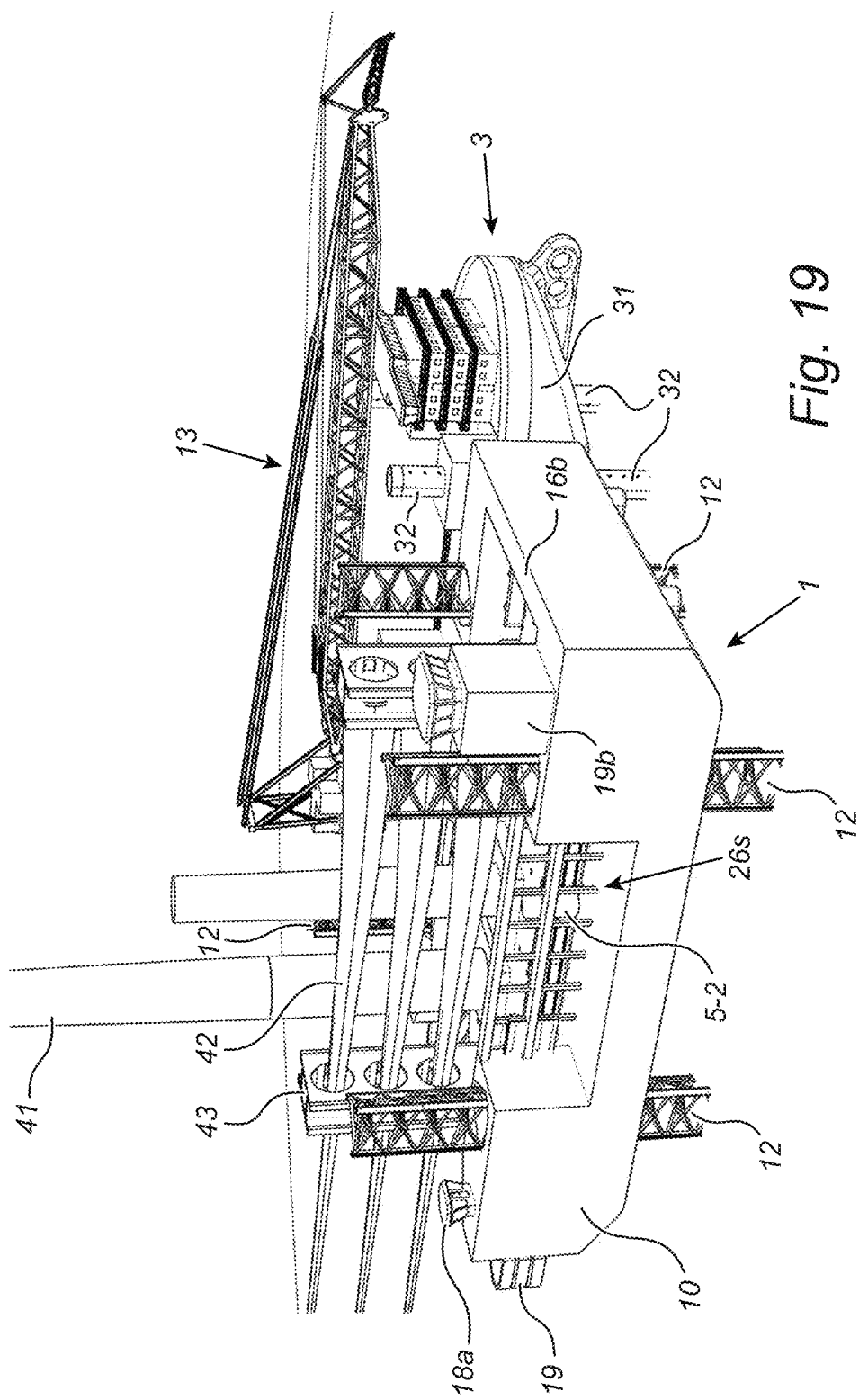
FIG. 19 represents a schematic perspective view of yet another step in the method of facilitating the offshore installation of a wind turbine, using the jack-up platform according to an embodiment of the invention.
Figure 20:
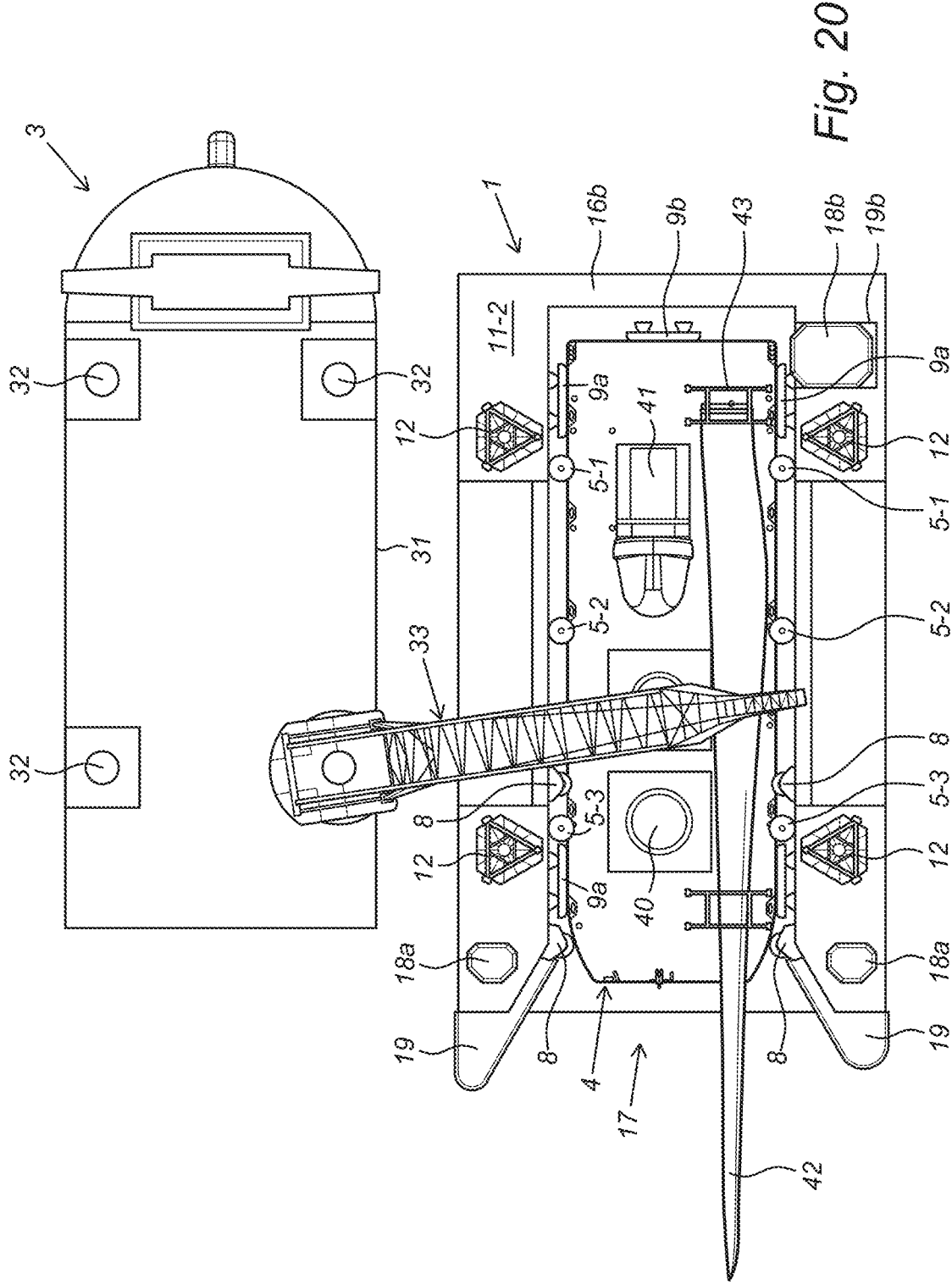
FIG. 20 represents a schematic top view of the method step shown in FIG. 19.

After the arrival of the jack-up vessel 1 at the final position, it may position itself using its dynamic positioning (DP) system, may put it legs 12 onto the underwater bottom 2, may pre-load the legs 12 and jack-up the hull 10, including the barge 4 with the components (40, 41, 42), out of the water, creating a fixed platform offshore. This position is shown in FIGS. 19 and 20. The final location may be located directly next to a pre-installed foundation for the wind turbine to be placed. In case the jack-up vessel 1 would not be equipped with its own thrusters 100, tugs (not shown) could be used to bring the jack-up vessel 1 into its final position until the legs 12 are onto the underwater bottom 2 and pre-loading has been completed. It may easily be understood that in a stable position of the jack-up platform 1 with its legs 12 resting on or in the underwater bottom 2, both lower level deck 11-1 and higher level deck 11-2 are completely jacked out of the water.

Figure 21:
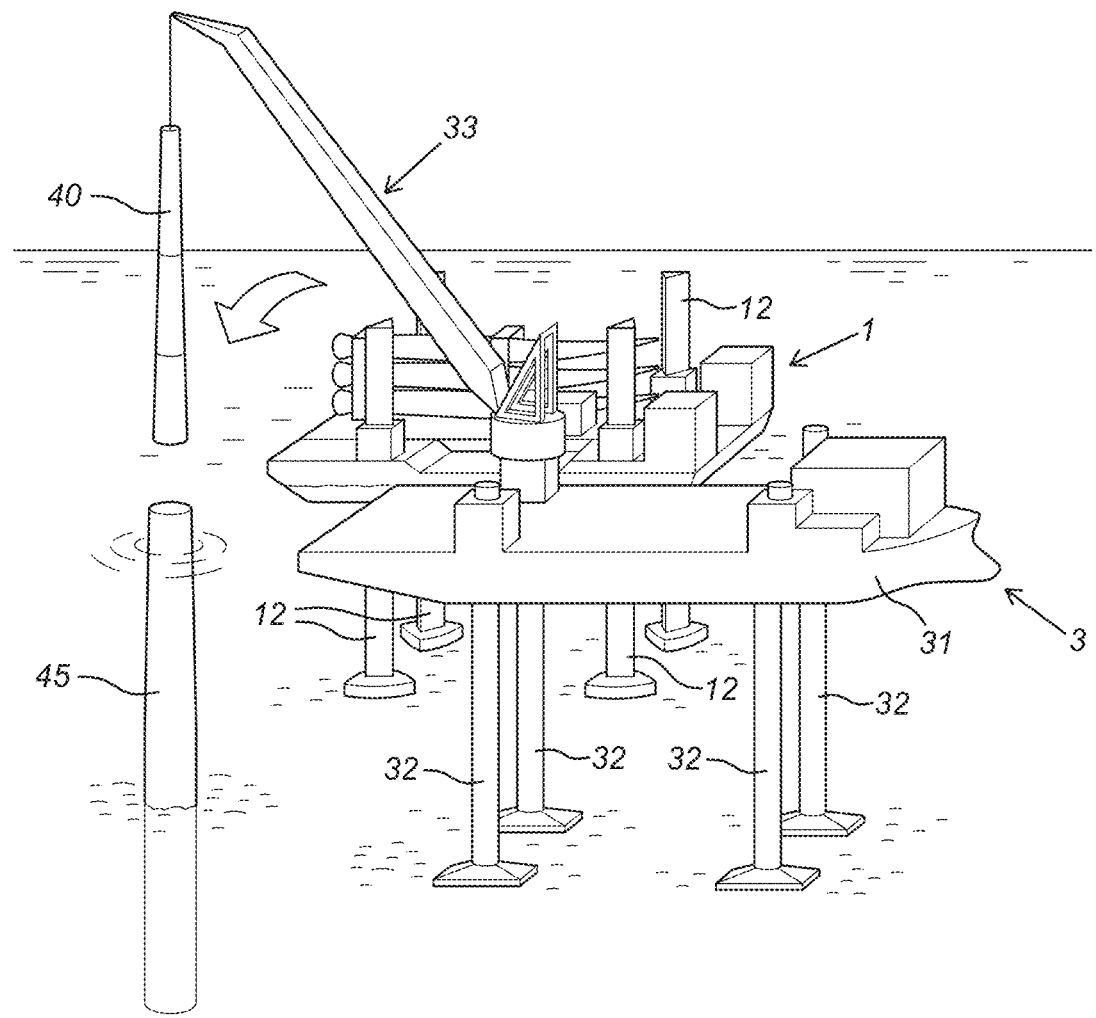
FIG. 21 represents a schematic perspective view of yet another step in the method of facilitating the offshore installation of a wind turbine, using the jack-up platform according to an embodiment of the invention.

In a further step, also illustrated by FIGS. 19 and 20, a main installation jack-up vessel 3 may have finished an installation of a wind turbine generator on a previous location, and has sailed towards the next location, where the jack-up vessel 1 will be waiting in jacked-up state. The main installation vessel 3 may position itself next to a pre-installed foundation 45 and next to the jack-up vessel 1, as shown, optionally using its dynamic positioning system. Once on position, it will lower its legs 32 onto the seabed 2, perform pre-loading activities, and will jack-up its hull 31 out of the water. In some cases, the main installation vessel 3 may already have arrived before the jack-up vessel 1 is on site. Whenever both vessels 1 and 3 are jacked-up, a lifting crane 33 provided on deck of the main installation vessel 3 may be deployed to start lifting the wind turbine generator components (40, 41, 42) from the deck of the barge 4. The lifting crane 33 may either lift the components (40, 41, 42) on deck of the main installation vessel 3, or may directly install the components (40, 41, 42) on the pre-installed foundation 45, as shown in FIG. 21.

Figure 22:
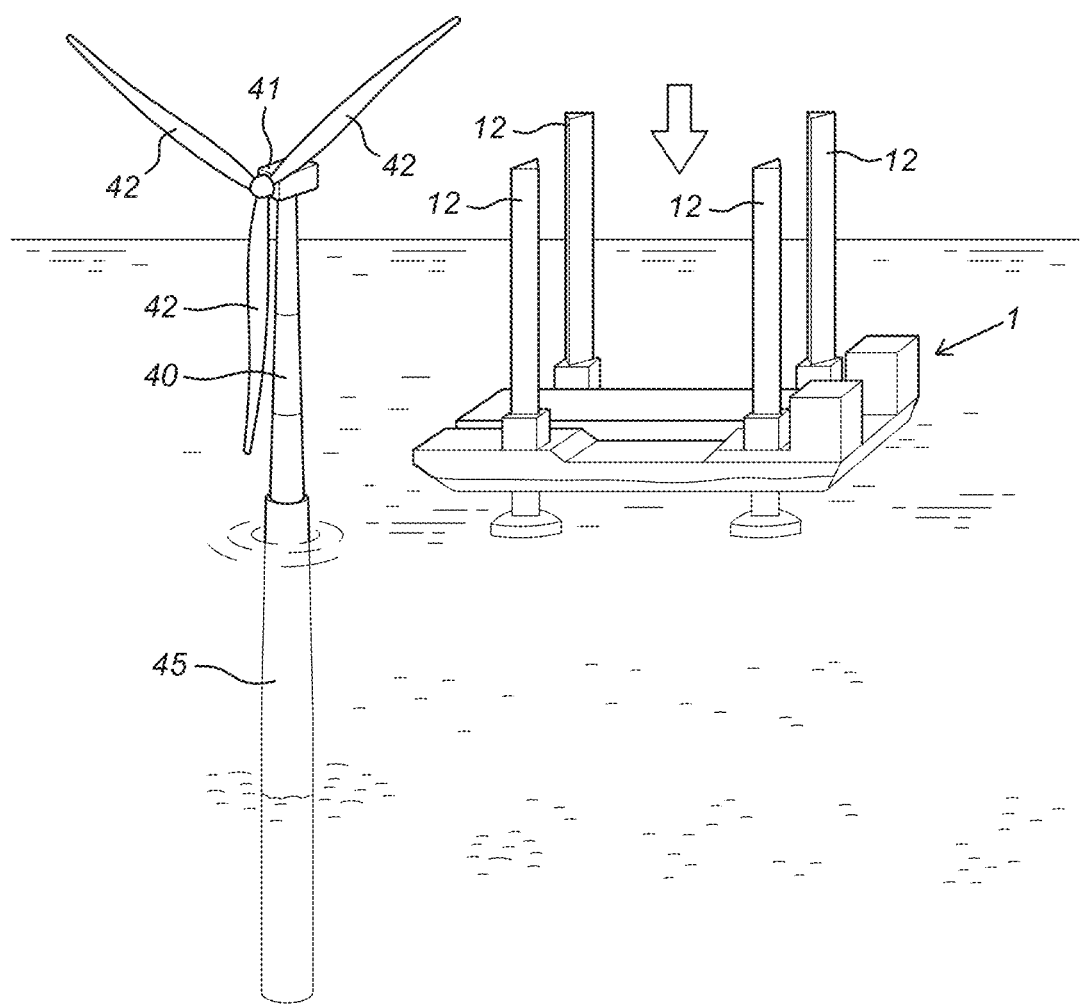
FIG. 22 represents a schematic perspective view of yet another step in the method of facilitating the offshore installation of a wind turbine, using the jack-up platform according to an embodiment of the invention; and finally

When all components (40, 41, 42) have been lifted from the deck of the barge 4, the jack-up platform 1, still carrying the barge 4, may jack-down again by retracting its legs 12 from the underwater bottom 2, and may sail away from the installation location, for instance to a safer location to perform a next docking cycle, as shown in FIG. 22. The main installation vessel 3 may stay at the current location as it may have to perform at least some more finalization works to the installed wind turbine (40, 41, 42). Once ready, the main installation vessel 3 may also jack-down, retract its legs 32 and sail to a next location.

Figure 23:
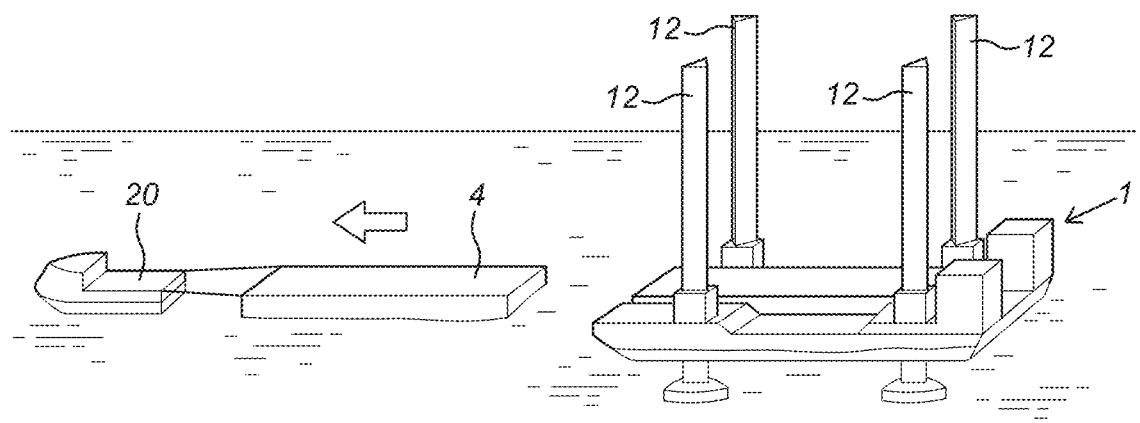
FIG. 23 represents a schematic perspective view of yet another step in the method of facilitating the offshore installation of a wind turbine, using the jack-up platform according to an embodiment of the invention.

With reference to FIG. 23, while the main installation vessel 3 is finishing up the works to complete the wind turbine generator installation, the jack-up platform 1 in a final step of the method may proceed with the barge 4 undocking procedure, which is the same procedure as described for the docking performed in reverse order. If needed, the legs 12 can be lowered again until a level above the seabed 2 to gain stability. The ballast pumps are activated to pump seawater into the ballast tanks within the hull 10 of the vessel 1, thereby increasing the draft of the vessel 1 to the higher draft 30-2 at which the lower level deck 11-1 is submerged and the barge 4 is floating in the receiving space or dock 15. A tug 20 may be connected to the unloaded barge 4, the winches or other connections from the barge 4 to the jack-up vessel 1 are released and the tug 20 tows the barge 4 out of the receiving space 15 and away from the jack-up vessel 1, as shown in FIG. 23. After this procedure, the jack-up vessel 1 may be immobilized until a next barge 4, loaded with equipment to be installed, arrives to be docked.

Because of potential safety implications, the above described docking/undocking process of the barge 4 in and out of the jack-up platform 1 may also be carried out at another location than the offshore wind farm itself. It may be carried out in the vicinity of the installation site, reasonably far from it, or even far away from the installation site of the offshore windfarm.

The invention is not limited to the above described embodiments and also comprises modifications thereof, to the extent that these fall within the scope of the claims appended below.

The invention claimed is:

1. A jack-up platform comprising a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water, wherein the jack-up platform further comprises a higher level deck and a lower level deck that define a receiving space for a barge, and further a deballasting system configured to bring the floating hull between a receiving position at which the hull is ballasted to a receiving draft in which the lower level deck is submerged underwater and adapted to receive the barge in the receiving space through an opening in the hull, and an operational smaller draft wherein substantially no water can flow on either of the lower and higher level decks, wherein the receiving space further comprises a centralizing system configured to substantially centralize the received floating barge in the receiving space, and further comprising floor fenders provided on the lower level deck, wherein the tower level deck of the receiving space comprises support elements, and the floor fenders in an uncompressed state extend higher than the support elements.

2. The jack-up platform according to claim 1, wherein the centralizing system is configured to substantially centralize the received floating barge in the middle of the receiving space in a transverse direction of the receiving space.

3. The jack-up platform according to claim 2, wherein the centralizing system comprises centralizing means provided in side walls of the receiving space, which centralizing means is brought in a position in which a surface thereof contacts a hull part of the barge with a non-zero force.

4. The jack-up platform according to claim 3, wherein the centralizing means comprise inflatable fenders that cooperate with a pressurizing pump for inflating the inflatable fenders.

5. The jack-up platform according to claim 1, wherein the deballasting system comprises water containers integrated with the hull and deballasting pumps configured for pumping water in and out of said water containers.

6. The jack-up platform according to claim 1, wherein an aft hull part comprises the opening in the hull for receiving the barge in the receiving space.

7. The jack-up platform according to claim 1, wherein the lower level deck of the receiving space comprises support elements for the barge having an upper support surface with a relatively high coefficient of friction.

8. The jack-up platform according to claim 1, wherein the entrance of the receiving space is bordered by two tapered guiding structures provided in each side of the entrance to the receiving space.

9. The jack-up platform according to claim 1, further comprising fenders provided at a side wall surface of the entrance to the receiving space and fenders provided at a side wall and/or a bow surface of the receiving space.

10. The jack-up platform according to claim 9, wherein the fenders provided at the side wall of the receiving space extend into the receiving space over a distance that does not interfere with the centralizing system when activated.

11. The jack-up platform according to claim 1, comprising a barge received in the receiving space.

12. A method for facilitating the offshore installation of a wind turbine, the method comprising the steps of:
  providing a jack-up platform in accordance with claim 1;
  with the platform in a floating position, ballasting the hull to the receiving draft in which the lower level deck is submerged underwater;
  receiving a barge, carrying parts for construction of a wind turbine, in the receiving space through an opening in the hull;

substantially centralizing the floating barge in the receiving space using the centralizing system;

with the platform in a floating position, deballasting the hull to the operational smaller draft in which substantially no water can flow on either of the lower and higher level decks, and the barge is supported by the lower level deck;

bringing the floating platform in the vicinity of an installation site for the wind turbine; and moving the legs of the jack-up platform to a lower position, in which the legs take support on the underwater bottom and the hull is jacked out of the water.

13. The method according to claim 12, wherein receiving the barge is carried out with the platform in a floating position.

14. The method according to claim 12, further comprising mooring a wind turbine installation vessel that comprises a lifting crane for the wind turbine construction parts alongside the jack-up platform.

15. The method according to claim 14, wherein seafastening means for the wind turbine construction parts are loosened to release said parts after the hull has been jacked out of the water, and the lifting crane lifts said wind turbine construction parts from the barge received in the jack-up platform to another substrate.

16. The method according to claim 12, wherein ballasting the hull is carried out to such extend that the water column in the receiving space is at least equal to the draft of the barge.

17. The method according to claim 12, wherein the legs are positioned in an intermediate position in between the low and high position of said legs, at least during receiving the barge.

18. The method according to claim 12, further comprising undocking the barge from the platform by ballasting the hull, with the platform in a floating position, to an exiting draft in which the lower level deck is submerged underwater and the barge is free-floating, and exiting the barge from the receiving space through the opening in the hull.

19. The method according to claim 12, wherein the legs are positioned in an intermediate position in between the low and high position of said legs during exiting the barge.

20. The method according to claim 12, wherein the parts for construction of a wind turbine comprise a foundation element, a tower element, a nacelle, and/or blades of a wind turbine.

21. A jack-up platform comprising a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water, wherein the jack-up platform further comprises a higher level deck and a lower level deck that define a receiving space for a barge and further a deballasting system configured to bring the floating hull between a receiving position at which the hull is ballasted to a receiving draft in which the lower level deck is submerged underwater and adapted to receive the barge in the receiving space through an opening in the hull, and an operational smaller draft wherein substantially no water can flow on either of the lower and higher level decks, wherein the hull comprises one of more further openings at one or both sides of the hull, and/or at the bow of the hull, and wherein the one or more openings are provided with a framework of stiffening ribs.

22. The jack-up platform according to claim 21, wherein the further openings of the hull are provided at both sides of the hull, and wherein the one further opening of the hull is provided at the bow of the hull.

23. The jack-up platform according to claim 21, wherein a lower wall of the one or more openings is level with the lower level deck surface.

24. The jack-up platform according to claim 21, further comprising a jack-up platform comprising a hull, and a number of legs that connect to the hull through jacking systems that are each configured to move a leg between a low position, in which the leg takes support on an underwater bottom and the hull is jacked out of the water, and a high position, in which the leg extends substantially above deck, is free from the underwater bottom, and the hull is floating on the water, wherein the jack-up platform further comprises a higher level deck and a lower level deck that define a receiving space for a barge and further a deballasting system configured to bring the floating hull between a receiving position at which the hull is ballasted to a receiving draft in which the lower level deck is submerged underwater and adapted to receive the barge in the receiving space through an opening in the hull, and an operational smaller draft wherein substantially no water can flow on either of the lower and higher level decks, wherein the receiving space further comprises a centralizing system configured to substantially centralize the received floating barge in the receiving space.

* * * * *

UNITED STATES PATENT AND TRADEMARK OFFICE
CERTIFICATE OF CORRECTION

| | |
|---|---|
| PATENT NO. | : 11,168,666 B1 |
| APPLICATION NO. | : 17/083550 |
| DATED | : November 9, 2021 |
| INVENTOR(S) | : Jeroen van Loon et al. |

It is certified that error appears in the above-identified patent and that said Letters Patent is hereby corrected as shown below:

In the Claims

Column 26, Line 18, Claim 1, delete "tower" and insert -- lower --

Signed and Sealed this
Third Day of May, 2022

Katherine Kelly Vidal
*Director of the United States Patent and Trademark Office*